US012741474B2

(12) United States Patent
Wong et al.

(10) Patent No.: US 12,741,474 B2
(45) **Date of Patent: *Sep. 22, 2026**

(54) OPTIMAL ALIGNMENT OF A PRINTHEAD IN A THERMAL PRINTING APPARATUS

(71) Applicant: Hand Held Products, Inc., Charlotte, NC (US)

(72) Inventors: Chin Young Wong, Singapore (SG); Ching Hong Chua, Singapore (SG); Yong Chiap Cheng, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 226 days.

This patent is subject to a terminal disclaimer.

(21) Appl. No.: 18/790,889

(22) Filed: Jul. 31, 2024

(65) Prior Publication Data

US 2024/0391262 A1 Nov. 28, 2024

Related U.S. Application Data

(63) Continuation of application No. 17/450,106, filed on Oct. 6, 2021, now Pat. No. 12,077,007, which is a (Continued)

(51) Int. Cl.
*B41J 2/045* (2006.01)
*B41J 2/33* (2006.01)
(Continued)

(52) U.S. Cl.
CPC ....... *B41J 25/3088* (2013.01); *B41J 2/04505* (2013.01); *B41J 2/33* (2013.01); (Continued)

(58) Field of Classification Search
CPC ...... B41J 25/3088; B41J 2/04505; B41J 2/33; B41J 2/3354; B41J 2/355; B41J 3/4075; (Continued)

(56) References Cited

U.S. PATENT DOCUMENTS 6,281,918 B1 8/2001 Burdick et al.
6,736,557 B2 5/2004 DeVore et al.
(Continued)

FOREIGN PATENT DOCUMENTS

EP 0806298 B1 2/2002
JP 2007268946 A * 10/2007 ................ B41J 2/01
(Continued)

OTHER PUBLICATIONS

Notice of Allowance and Fees Due (PTOL-85) Mailed on Jun. 15, 2020 for U.S. Appl. No. 16/375,244, 9 page(s).
(Continued)

*Primary Examiner* — Yaovi M Ameh
(74) *Attorney, Agent, or Firm* — Alston & Bird LLP

(57) ABSTRACT

Provided herein is a printer comprising a printing assembly. The printing assembly comprises a printhead bracket fixedly attached to the printer, a printhead that defines a groove, the printhead aligned at a first alignment, an alignment adjuster fastened between the printhead bracket and the printhead, and a plurality of fasteners operatively engaged with the alignment adjuster. The alignment adjuster comprises a gear rack that is adjacent to the printhead bracket, and a protrusion that is received by the groove of the printhead. The plurality of fasteners comprises at least one selected from a group of a lateral adjustment fastener operatively engaged with the gear rack, and a rotational adjustment fastener operatively engaged with a transverse edge of the printhead. The lateral adjustment fastener is configured to provide lateral movement to the alignment adjuster and the printhead. The rotational adjustment fastener is configured to provide rotational movement to the printhead.

20 Claims, 9 Drawing Sheets

Related U.S. Application Data continuation of application No. 17/017,932, filed on Sep. 11, 2020, now Pat. No. 11,179,953, which is a continuation of application No. 16/375,244, filed on Apr. 4, 2019, now Pat. No. 10,807,394.

(51) Int. Cl.

| | |
|---|---|
| ***B41J 2/335*** | (2006.01) |
| ***B41J 2/355*** | (2006.01) |
| ***B41J 3/407*** | (2006.01) |
| ***B41J 25/308*** | (2006.01) |
| ***B41J 29/393*** | (2006.01) |
| ***B65C 9/46*** | (2006.01) |
| *B41J 2/325* | (2006.01) |

(52) U.S. Cl.

CPC ............. *B41J 2/3354* (2013.01); *B41J 2/355* (2013.01); *B41J 3/4075* (2013.01); *B41J 25/3086* (2013.01); *B41J 29/393* (2013.01); *B65C 9/46* (2013.01); *B41J 2/325* (2013.01); *B41J 25/308* (2013.01); *B41J 2202/31* (2013.01); *B41J 2202/38* (2013.01)

(58) Field of Classification Search

CPC ...... B41J 25/3086; B41J 29/393; B41J 2/325; B41J 25/308; B41J 2202/31; B41J 2202/38; B65C 9/46

See application file for complete search history.

(56) References Cited

U.S. PATENT DOCUMENTS

| | | | | |
|---|---|---|---|---|
| 9,701,140 | B1 | 7/2017 | Alaganchetty et al. | |
| 10,399,361 | B2 | 9/2019 | D'Armancourt et al. | |
| 10,807,394 | B1 | 10/2020 | Wong et al. | |
| 11,179,953 | B2 * | 11/2021 | Wong | B41J 2/3354 |
| 12,077,007 | B2 * | 9/2024 | Wong | B41J 2/04505 |
| 2002/0126169 | A1 | 9/2002 | Wyngaert et al. | |
| 2007/0273091 | A1 * | 11/2007 | Kamiya | B65H 9/101 271/233 |
| 2013/0199444 | A1 | 8/2013 | Hartmann | |
| 2016/0159598 | A1 * | 6/2016 | Yamane | G03G 15/6561 271/227 |

FOREIGN PATENT DOCUMENTS

| | | | | |
|---|---|---|---|---|
| JP | 2018-090416 A | | 6/2018 | |
| WO | WO-2013111514 A1 | * | 8/2013 | B41J 25/308 |

OTHER PUBLICATIONS

Notice of Allowance and Fees Due (PTOL-85) Mailed on May 2, 2024 for U.S. Appl. No. 17/450,106, 10 page(s).

Notice of Allowance received for U.S. Appl. No. 17/017,932, mailed on Jul. 6, 2021, 9 pages.

U.S. Appl. No. 17/450,106, filed Oct. 6, 2021, U.S. Pat. No. 12,077,007, Patented.

U.S. Appl. No. 17/017,932, filed Sep. 11, 2020, U.S. Pat. No. 11,179,953, Patented.

U.S. Appl. No. 16/375,244, filed Apr. 4, 2019, U.S. Pat. No. 10,807,394, Patented.

* cited by examiner

OPTIMAL ALIGNMENT OF A PRINTHEAD IN A THERMAL PRINTING APPARATUS

CROSS-REFERENCE TO RELATED APPLICATIONS

This application is a continuation of U.S. patent application Ser. No. 17/450,106, filed Oct. 6, 2021, titled "Optimal Alignment Of A Printhead In A. Thermal Printing Apparatus," which is a continuation of U.S. patent application Ser. No. 17/017,932, filed Sep. 11, 2020 (now U.S. Pat. No. 11,179,953, issued Nov. 23, 2021), titled "Optimal Alignment Of A Printhead In A Thermal Printing Apparatus," which is a continuation of U.S. patent application Ser. No. 16/375,244, filed Apr. 4, 2019, titled "Optimal Alignment Of A Printhead In A Thermal Printing Apparatus" (now U.S. Pat. No. 10,807,394 issued Oct. 20, 2020), the contents of each of which is incorporated by reference herein in their entirety.

TECHNOLOGICAL FIELD

Example embodiments of the present disclosure relate generally to printers, and more particularly, to an optimal alignment of a printhead in a thermal printing apparatus.

BACKGROUND

In a thermal printing apparatus, a printhead assembly comprises a burn line configured to print on media as the media passes through between the burn line and platen assembly. The platen assembly comprises a platen roller that is configured to rotate on a platen axis and further configured to support the media during printing operation.

During such printing operation, a proper and accurate alignment of the burn line of the printhead assembly with respect to the platen roller of the platen assembly controls the print quality of the thermal printing apparatus. Such proper and accurate alignment of the burn line may be a very precise and challenging task.

Applicant has identified various deficiencies and problems associated with conventional techniques for printhead alignment. Through applied effort, ingenuity, and innovation, many of these identified problems have been solved by developing solutions that are included in embodiments of the present disclosure, many examples of which are described in detail herein.

SUMMARY

Accordingly, in one aspect, the present apparatus and method addresses the problem by employing a printer comprising a printing assembly. The printing assembly comprises a printhead bracket fixedly attached to the printer, a printhead that defines a groove, the printhead aligned at a first alignment, an alignment adjuster fastened between the printhead bracket and the printhead, and a plurality of fasteners operatively engaged with the alignment adjuster. The alignment adjuster comprises a gear rack that is adjacent to the printhead bracket, and a protrusion that is received by the groove of the printhead. The plurality of fasteners comprises at least one selected from a group of a lateral adjustment fastener operatively engaged with the gear rack, and a rotational adjustment fastener operatively engaged with a transverse edge of the printhead. The lateral adjustment fastener is configured to provide lateral movement to the alignment adjuster and the printhead. The rotational adjustment fastener is configured to provide rotational movement to the printhead.

In an embodiment, the printhead bracket may further comprise a longitudinal channel that receives the lateral adjustment fastener.

In an embodiment, the alignment adjuster may further comprise a slot along a second transverse edge of the alignment adjuster that receives the rotational adjustment fastener.

In an embodiment, the printing assembly may further comprise a set of slots aligned in parallel in each of the printhead bracket, the alignment adjuster, and the printhead, the set of slots receiving the set of additional fasteners. The set of additional fasteners may be configured to lock the printing assembly in response to engagement of the set of additional fasteners with the set of slots. The set of additional fasteners may be further configured to unlock the printing assembly in response to disengagement of the set of additional fasteners from the set of slots.

In an embodiment, the plurality of fasteners may be configured to align the printhead at a second alignment in response to manual manipulation.

The printhead comprises at least one burn line. The at least one burn line of the printhead comprises a plurality of heating elements configured to perform a printing operation.

In an embodiment, the printer may further comprise a verifier module associated with the printing assembly, and a processing module associated with the verifier module. The verifier module in conjunction with the processing module, may be configured to detect print quality of a printing operation on a print media, and determine that the detected print quality of the printing operation is less than a threshold value.

In an embodiment, the processing module may be further configured to generate an input signal based on the determination of the detected print quality of the printing operation being less than the threshold value.

In an embodiment, the printer may further comprise a plurality of actuators for manipulating the plurality of fasteners, and a control unit associated with the processing module. The control unit may be configured to activate the plurality of actuators based on the generated input signal to align the printhead at a second alignment.

In an embodiment, the processing module may be configured to receive input from a verifier module, and determine, based on the input received from the verifier module, a deviation value of a base line of indicia grading with respect to a print media when the printhead is aligned at the first alignment. The processing module may be further configured to determine a lateral movement value, a rotational movement value, or both for alignment of the printhead based on the determined deviation value. The processing module may be further configured to generate an input signal based on the determined lateral movement value, the rotational movement value, or both for alignment of the printhead.

In an embodiment, the activated plurality of actuators may be configured to manipulate the plurality of fasteners to align the printhead at a second alignment according to the lateral movement value, the rotational movement value, or both. The print quality of a printing operation performed by the printhead at the second alignment exceeds a threshold value.

In an embodiment, the printhead may be attached with a heatsink clement to dissipate heat generated during a printing operation performed by the printhead. The printing assembly is housed in a printing apparatus, wherein the printing apparatus is one selected from a group of a direct thermal printing apparatus and a thermal transfer printing apparatus.

In an embodiment, the lateral adjustment fastener may comprise (1) a shaft and (2) a pinion towards a distal end of the shaft, wherein the pinion is engaged with the gear rack of the alignment adjuster. In some embodiments, the pinion is embodied by a helical gear, and the gear rack and pinion of the lateral adjustment fastener define a helical gear arrangement.

In an embodiment, the transverse edge of the printhead engaged with the rotational adjustment fastener, and wherein the rotational adjustment fastener comprises a rotational worm shaft.

In accordance with another aspect of the disclosure, a method for printhead alignment in a printing assembly is disclosed. The method may comprise detecting that a print quality of a printing operation performed by a printhead aligned at a first alignment is below a threshold value, determining a lateral movement, determining a rotational movement, manipulating a lateral adjustment fastener, and/or a rotational adjustment fastener based on the lateral movement and rotational movement, to align the printhead of the printing assembly at a second alignment, and verifying the print quality of the printing operation performed by the printhead aligned at the second alignment as exceeding the threshold value.

In an embodiment, the method may further comprise unlocking the printing assembly based on disengaging a set of fasteners when the detected print quality of the printhead aligned at the first alignment is below the threshold value, wherein the set of fasteners are disengaged for unlocking the printing assembly by at least one selected from a group of a manual operation or an automatic operation using a plurality of actuators.

In an embodiment, the method may further comprise locking the printing assembly based on engaging a set of fasteners with the printhead aligned at the second alignment when the print quality of the printing operation performed by the printhead aligned at the second alignment is verified to be exceeding the threshold value, wherein the set of fasteners are engaged for locking the printing assembly by at least one selected from a group of a manual operation or an automatic operation using a plurality of actuators.

In an embodiment, the method may further comprise detecting, by a verifier module in conjunction with a processing module, the print quality of the printing operation on a print media when the printhead is aligned at the first alignment, and generating, by the processing module, an input signal based on the determination of the detected print quality of the printing operation being less than the threshold value.

In an embodiment, the method may further comprise activating, by a control unit, a plurality of actuators based on the generated input signal, wherein the activated plurality of actuators cause a manipulation of the lateral adjustment fastener, and/or the rotational adjustment fastener, to align the printhead of the printing assembly at the second alignment. In an embodiment, the manipulation of the lateral adjustment fastener, and/or the rotational adjustment fastener, is performed manually.

In accordance with another aspect of the disclosure, a printing assembly is disclosed. The printing assembly may comprise a printhead bracket fixedly configured to be fixedly attached to a component of a printer, a printhead that defines a groove, the printhead aligned at a first alignment, and an alignment adjuster fastened between the printhead bracket and the printhead. The alignment adjuster may comprise a gear rack that is adjacent to the printhead bracket, and a protrusion that is received by the groove of the printhead. The printing assembly may further comprise a plurality of fasteners operatively engaged with the alignment adjuster, wherein the plurality of fasteners comprises at least one selected from a group of a lateral adjustment fastener operatively engaged with the gear rack and a rotational adjustment fastener operatively engaged with a transverse edge of the printhead. The lateral adjustment fastener may be configured to provide a lateral movement to the alignment adjuster and the printhead. The rotational adjustment fastener may be configured to provide a rotational movement to the printhead.

In an embodiment, the printhead bracket may further comprise a longitudinal channel that receives the lateral adjustment fastener.

In an embodiment, the alignment adjuster may further comprise a slot along a second transverse edge of the alignment adjuster that receives the rotational adjustment fastener.

In an embodiment, the printing assembly may further comprise a set of slots aligned in parallel in each of the printhead bracket, the alignment adjuster, and the printhead, the set of slots receiving the set of additional fasteners. The set of additional fasteners may be configured to lock the printing assembly in response to engagement of the set of additional fasteners with the set of slots. The set of additional fasteners may be further configured to unlock the printing assembly in response to disengagement of the set of additional fasteners from the set of slots.

In an embodiment, the plurality of fasteners may be configured to align the printhead at a second alignment in response to manual manipulation.

In an embodiment, the printhead may comprise at least one burn line, wherein the at least one burn line of the printhead comprises a plurality of heating elements configured to perform a printing operation. The printhead may be attached with a heatsink element to dissipate heat generated during a printing operation performed by the printhead.

In an embodiment, the printing assembly may be housed in a printing apparatus, wherein the printing apparatus is one selected from a group of a direct thermal printing apparatus and a thermal transfer printing apparatus.

In an embodiment, the lateral adjustment fastener may comprise (1) a shaft and (2) a pinion towards a distal end of the shaft, wherein the pinion is engaged with the gear rack of the alignment adjuster. In an embodiment, the transverse edge of the printhead engaged with the rotational adjustment fastener, and wherein the rotational adjustment fastener comprises a rotational worm shaft.

In accordance with another aspect of the disclosure, there is disclosed a printing assembly comprising the printhead bracket, the alignment adjuster, the printhead, and the plurality of fasteners. The printhead bracket may have a first lower lateral surface and a longitudinal channel parallel to a longitudinal edge of the printhead bracket. The alignment adjuster may have a second upper lateral surface and a second lower lateral surface. The second upper lateral surface of the alignment adjuster may be adjacent to the first lower lateral surface of the printhead bracket, where the second upper lateral surface of the alignment adjuster comprises a gear rack. The second lower lateral surface of the alignment adjuster may comprise a protrusion. The alignment adjuster may include a slot along a transverse edge of the alignment adjuster. The printhead may have a third upper lateral surface and a third lower lateral surface. The third upper lateral surface of the printhead may be adjacent to the second lower lateral surface of the alignment adjuster. The third lower lateral surface of the printhead may comprise at least one burn line. The third upper lateral surface of the printhead may comprise a groove configured to receive the protrusion of the second lower lateral surface of the alignment adjuster. The plurality of fasteners may comprise at least one of a lateral adjustment fastener, a rotational adjustment fastener, and set of additional fasteners. The lateral adjustment fastener may be arranged laterally on the second upper lateral surface of the alignment adjuster through the longitudinal channel of the printhead bracket. The rotational adjustment fastener may be received in the slot of the alignment adjuster. The set of additional fasteners may be received in a set of slots aligned in parallel in each of the printhead bracket, the alignment adjuster, and the printhead.

In an embodiment, the lateral adjustment fastener comprises (1) a shaft and (2) a pinion towards an end of the shaft. The pinion may be configured to be engaged with the gear rack of the second upper lateral surface of the alignment adjuster. The rotational adjustment fastener may comprise a rotational worm shaft.

In an embodiment, the printhead may comprise a toothed edge on a transverse edge of the printhead, and wherein the rotational worm shaft is configured to be engaged with the toothed edge of the printhead. The set of additional fasteners may be manipulated according to one selected from the group of a first adjustment and a second adjustment. The printing assembly may be unlocked in accordance with the first adjustment in a first direction. The printing assembly may be locked in accordance with the second adjustment in a second direction opposite the first direction.

In an embodiment, the manipulation of at least one selected from the group of the lateral adjustment fastener, the rotational adjustment fastener, and the set of additional fasteners may be performed manually. In an embodiment, the at least one burn line of the third lower lateral surface of the printhead may comprise a plurality of heating elements configured to perform a printing operation.

The above summary is provided merely for purposes of summarizing some exemplary embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which are further explained within the following detailed description and its accompanying drawings.

BRIEF DESCRIPTION OF THE DRAWINGS

The description of the illustrative embodiments may be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure according to one or more embodiments of the present disclosure are shown and described with respect to the figures presented herein, in which.

DETAILED DESCRIPTION

Figure 1:
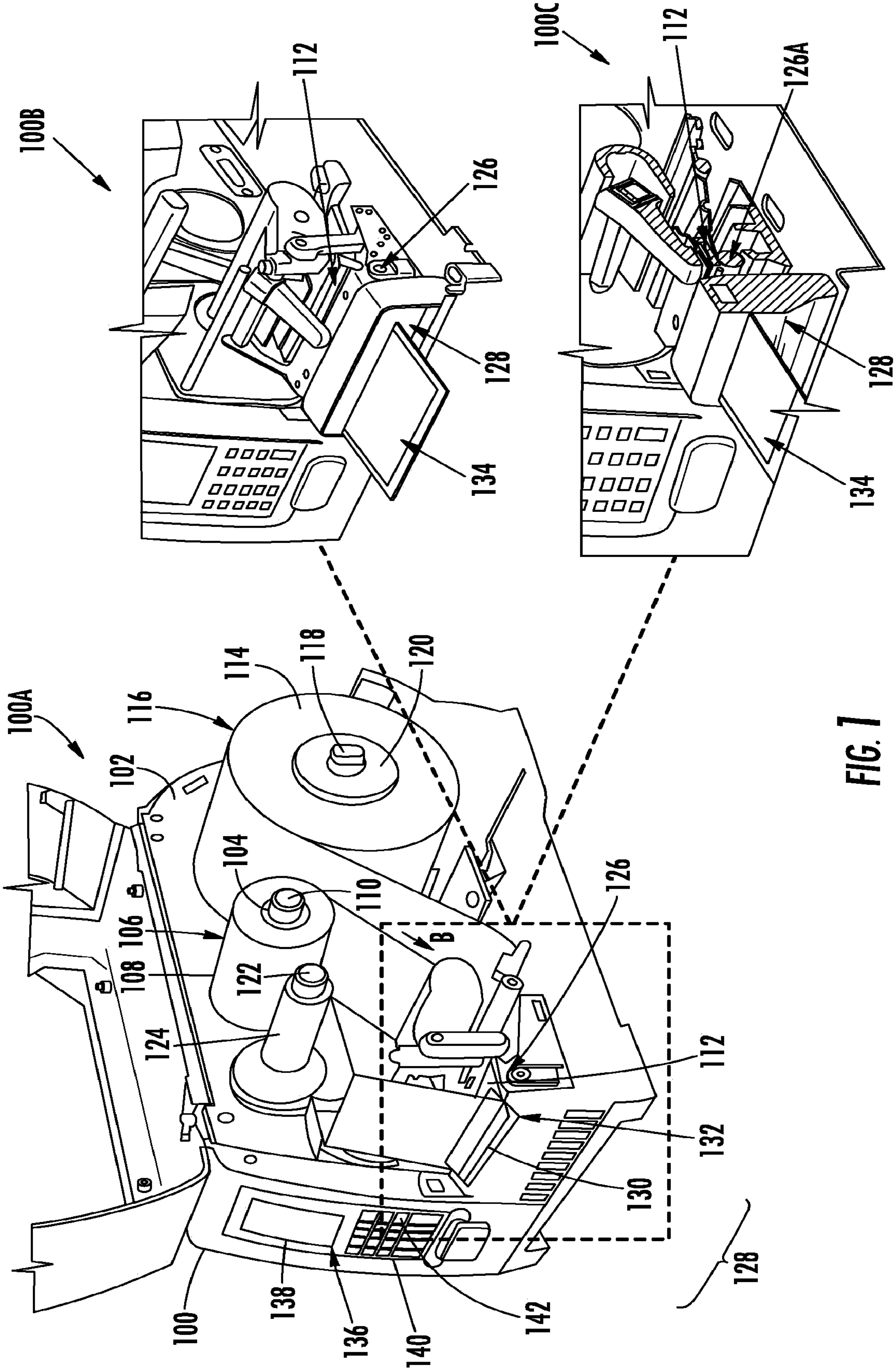
FIG. 1 illustrates a perspective view of a printing apparatus, in accordance with one or more embodiments of the present disclosure described herein.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein. Rather, these embodiments are provided so that this disclosure will satisfy applicable legal requirements. Like numbers refer to like elements throughout. Terminology used in this patent is not meant to be limiting insofar as devices described herein, or portions thereof, may be attached or utilized in other orientations.

The term "comprising" means including but not limited to, and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "may," "may," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in an embodiment, or it may be excluded.

In various example embodiments, the term "print media" is used herein to mean a printable medium (such as a page, a paper, other media) on which print image (such as graphics, text, visual images, and/or the like) may be printed. The print media may correspond to a continuous media that may be loaded in a printing apparatus in form of a roll or a stack or, in other examples, may be semi-continuous or not continuous at all (e.g., single feed of a particular print media). In some embodiments, the print media may correspond to a thermal media on which the content is printed through application of heat on the print media itself. In alternate embodiments, the print media may correspond to a liner media, a liner-less media, and/or the like.

In some embodiments, continuous print media may be divided into one or more portions through perforations defined along a width of the print media. Alternatively or additionally, the print media may be divided into the one or more portions through one or more marks that are defined at a predetermined distance from each other. In an example embodiment, a contiguous stretch of the print media, between two consecutive marks or two consecutive perforations, corresponds to a portion of the print media.

In various example embodiments, the term "print image" is used herein to mean an image that is to be printed on the print media. The print image may include one or more image components such as, but not limited to, decodable indicia (such as a barcode or a QR code), text content, graphical symbols, and the like, in a specified layout.

In various example embodiments, the term "image buffer" is used herein to mean a storage area reserved in a thermal printing apparatus. Specifically, the image buffer includes a print image that is to be printed on the print media. Based on the image data rendered in the image buffer, the thermal printing system or apparatus may be configured to control the printhead in an appropriate way at appropriate timing to print the print image on the print media. In various embodiments, the image buffer may be further configured to store property information associated with the print image. Examples of the property information may include, but are not limited to, gray levels, ANSI grade levels, numeric ANSI grades, and/or bar width growth percentages. The property information may further include type of decodable indicia, for example CODE39.

In various example embodiments, the term "burn line" is used herein to mean a printhead component that includes multiple heating elements disposed thereon, which, under the control of a control unit, is activated in a pattern that an image, corresponding to the print image stored in the image buffer, is replicated/imprinted on the print media.

In various example embodiments, the term "printhead" is used herein to mean an assembly that includes one or more burn lines to print a print image on the print media. In an embodiment, the printhead may include a plurality of heating elements in each burn line that is energized (or heated) and pressed against a ribbon or the print media (such as a thermal paper) to perform the printing operation. In an embodiment, during the printing operation, a set of heating elements are energized to perform the printing operation. The set of heating elements may be selected based on the position of the various image components included in the print image to be printed on the print media.

In various example embodiments, the term "web direction" is used herein to mean a direction in which the print media travels towards the printhead during a printing operation.

In various example embodiments, the term "cross-web direction" is used herein to mean a direction that is orthogonal/transverse to the web direction. In other words, the cross-web direction is a direction that is orthogonal/transverse to the direction in which the print media exits away from the printhead.

In various example embodiments, the term "Contact Image Sensor (CIS)" is used herein to mean a device that includes an array of linear sensors that captures the image content of the print media as the print media traverses through a verifier module to generate a two-dimensional grayscale image of the print media. The grayscale image may then be analyzed to determine the print quality of a region-of-interest (including decodable indicia, such as a barcode) according to, for example ANSI X3.182 and ISO/IEC 15416 standards or other barcode verification standards that may be established in the future.

In various example embodiments, the terms "verifier" and "verification module" are used herein to describe an apparatus, module, and/or device that monitors printing quality. In some embodiments, a verifier determines whether the printing of the print media is of acceptable quality and/or determines if there are issues or concerns with the printing of a decodable indicia onto print media, using one or more detection algorithms. The verifier may analyze and determine the acceptable quality of the decodable indicia/symbol (such as a barcode) by measuring the characteristics of the barcode (i.e. scan reflectance profile) to industry standards, such as ANSI X3.182, ISO/IEC 15415 and ISO/IEC 15416 standards. For example, for ID linear barcodes, the quality parameters that may be measured to detect a problem may include: edge determination, minimum reflectance, symbol contrast, minimum edge contrast, modulation, defect, decode, decodability, and quiet zone. In another example, for 2D matrix symbols, in addition to symbol contrast and modulation, the quality parameters that may be measured to detect a problem may include: unused error correction, fixed (finder) pattern damage, grid non-uniformity, and axial non-uniformity. In an example embodiment, a ribbon wrinkle problem may cause printing on media of a barcode or barcodes having voids in the barcode(s), resulting in failed decodability. In another example embodiment, barcode width variation problem may cause printing of a barcode or barcodes having excessive ink spread resulting in low modulation because very narrow spaces may appear to be filled in by the encroaching bars in the scan reflectance profile.

Examples of such issues may include but are not limited to, ribbon wrinkle, stained print media, damaged print media, defective print media, printing lapses, and barcode width variations. In response to such issues, automatic correction may be performed by the indicia verifier, and/or associated processing module(s), to allow the printing system to continue printing without pausing. Some verifiers are categorized based on type of operating mode, for example online and offline verifiers. Alternatively or additionally, there may be other verifiers that may be categorized based type of operating arrangement with respect to the printer, for example, an integrated verifier or a standalone verifier that is communicatively coupled with the printer via an interface.

The term "processor", "processing unit", "processing module", "processing system", and/or the like, is used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a non-volatile memory or a combination of volatile and non-volatile memory or nonvolatile memory. The memory can also be located internal to another computing resource (e.g., enabling computer readable instructions to be downloaded over the Internet or another wired or wireless connection).

For the purposes of this description, a general reference to "memory" refers to a non-volatile memory, or combination of volatile and non-volatile memory storage, accessible by the processors, including internal memory, removable memory plugged into the device, and memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, and similar electronic devices equipped with at least a processor configured to perform the various operations described herein.

Overview

During a printing operation and in some examples, an optimal alignment of burn line(s) of a printhead assembly with respect to the platen roller of a platen assembly controls the print quality of a printing apparatus. Obtaining such optimal alignment of the burn line(s) may be, in some examples, a very precise and challenging task that may require the placement of the burn line(s) optimal location and/or optimal parallel orientation of the burn line with respect to the platen roller.

In certain example scenarios, there may be a slight deviation of the burn line of the printhead assembly with respect to the platen roller of the platen assembly, which may adversely affect the print quality of the printing apparatus. For example, in certain cases, during first production assembly of a printhead and a printhead bracket, there may be an inaccuracy of the printhead alignment with respect to the platen roller of the platen assembly, for example due to operator alignment error or parts tolerance. In other cases, during usage, the burn line may become dislocated or otherwise misaligned due to mechanical movement and/or vibration during printing operation. Further, in other example cases, the factory position of the burn line may be set by default for a first media, such as commonly used thin media. However, in certain cases a second media may be used, such as a thicker media, for which the optimal position of the burn line may be different. Alternatively, there may be cases where the wear and tear of the burn line of the printhead may affect the print quality. In such cases and in other examples described herein, the burn line of the printhead assembly may need to be optimally aligned with the platen roller of the platen assembly. In such examples methods, an operator/user may be required to disassemble the printhead assembly and mount the printhead assembly again with a proper and accurate alignment, which may be very time consuming and tedious for the operator/user, and substantial productive hours may be lost.

The embodiments disclosed herein include apparatuses, systems, and methods that employ a printing assembly including a printhead bracket, an alignment adjuster, and a printhead. The alignment adjuster is fastened between the printhead bracket and the printhead. The printing assembly further includes a plurality of fasteners operatively engaged with the alignment adjuster, including at least a lateral adjustment fastener and a rotational adjustment fastener, which enable adjustment of the printhead from a first alignment to a second alignment with respect to a platen roller within a printer. The printhead bracket is configured to be fixedly attached to the printer. In some embodiments, the printhead defines a groove that receives a protrusion of the alignment adjuster. In some embodiments, the alignment adjuster comprises a gear rack that is adjacent to the printhead bracket, where the lateral adjustment fastener is operatively engaged with the gear rack. In some embodiments, the printhead includes a transverse edge, where the rotational adjustment fastener is operatively engaged with the transverse edge of the printhead. The lateral adjustment fastener is configured to provide lateral movement to the alignment adjuster and the printhead. The rotational adjustment fastener is configured to provide rotational movement to the printhead.

In an embodiment, the plurality of fasteners may be configured to align the printhead at a second alignment in response to manual manipulation.

In other embodiments, the plurality of fasteners may be configured to align the printhead at a second alignment in response to automatic manipulation. For example, in some embodiments, a printer including the printing assembly may further comprise a verifier module associated with the printing assembly, and a processing module associated with the verifier module. The verifier module, in conjunction with the processing module, is configured to detect print quality of a printing operation on a print media, and determine that the detected print quality of the printing operation is less than a threshold value. In some embodiments, the printer may further comprise a plurality of actuators for manipulating the plurality of fasteners, and a control unit associated with the processing module. The control unit is configured to activate the plurality of actuators based on the generated input signal to align the printhead at a second alignment.

FIG. 1 illustrates a perspective view of a printing apparatus, in accordance with one or more embodiments of the present disclosure described herein. More specifically, FIG. 1 illustrates printing components in a first view 100A of a printing apparatus, such as a thermal printer 100. The printing components include a casting body 102 for enclosing an interior thereof. The thermal printer 100 further comprises a power source and a moveable cover (no shown in FIG. 1 for purposes of illustration) for accessing the interior. The casting body 102 may be a support body for the thermal printer 100 that includes a central support member and a base member, which are monolithically formed from a heat conductive material, such as cast aluminum, ceramics, plastics, sheet metal, and the like. By casting the central support member and the base member monolithically, heat dissipation from within the thermal printer 100, in some examples, may be improved. The casting body 102 may include various recesses configured to receive each of the assemblies in a specific orientation such that when each of the assemblies is secured to the casting body 102, the assemblies are supported in an operative configuration.

In the case of a thermal transfer printer, there may be a ribbon supply spindle 104 contained within the casting body 102. A ribbon supply roll 106 is configured to be disposed on the ribbon supply spindle 104. The ribbon supply roll 106 comprises ink ribbon 108 wound on a ribbon supply spool 110. The ink ribbon 108 supplies the media (e.g., ink) that transfers onto a print medium, such as print media 114 as the ink ribbon is unwound from the ribbon supply spool 110 along a ribbon path (arrow B in FIG. 1). A ribbon rewind spindle 122 on which unwound ribbon is wound up may also be contained within the casting body 102. A ribbon take-up 124 may be disposed on the ribbon rewind spindle 122 although the ribbon take-up 124 on the ribbon rewind spindle 122 may not be necessary. In an embodiment for a direct transfer printer, the ribbon supply spool 110, the ribbon rewind spindle 122, and the ink ribbon 108 may be eliminated and a thermally sensitive paper substituted for the print media 114.

Such printing components, as described above, in the thermal printer 100 may be independently attachable to and detachable from the casting body 102. As such, the thermal printer 100 may be easily and quickly converted from an ink ribbon printer to a thermal ink printer and vice-versa by installing the appropriate printhead assembly module and the appropriate media take-up assembly module into the thermal printer 100. Additionally, different circuit boards may be installed for selectively controlling operation of the thermal printer 100. For example, different circuit boards or additional circuit boards may be installed to convert the thermal printer 100 from the thermal ink printer to the ink ribbon printer or vice-versa.

The thermal printer 100 may further comprise a printing assembly 112 utilized to thermally transfer a portion of ink from the ink ribbon 108 to the print media 114 as the ink ribbon is unwound from the ribbon supply spool 110 along the ribbon path and the print media 114 is unwound from a media supply spool 120 along a media path (arrow C in FIG. 1). A media supply roll 116 comprises the print media 114 wound on the media supply spool 120. A media supply spindle 118 on which the media supply roll 116 is configured to be disposed is contained within the casting body 102.

The thermal printer 100 may further comprise one or more motors (not shown) for rotating the ribbon supply spindle 104 and the ribbon supply roll 106 disposed thereon (if present) in a forward (i.e. web direction indicated by arrow A in FIG. 1). Accordingly, the one or more motors further rotate the media supply spindle 118, upon which the media supply roll 116 is disposed, in a forward rotational direction such that the forward rotational direction of both the ribbon supply spindle 104 and the media supply spindle 118 are synchronized with respect to each other.

Referring to the combination of the first view 100A and second view 100B in FIG. 1, there is further shown a platen roller assembly 126 driven by a stepper motor (not shown) rotating at a defined stepping rate. Accordingly, the platen roller assembly 126 may be configured to transport the print media 114 in a defined transport direction at a defined transport rate. The platen roller assembly 126 includes a platen roller 126A, as shown in the third view 100C in FIG. 1, configured for moving the ink ribbon 108 and the print media 114 (such as a label 134) through the printing assembly 112 by providing a surface for supporting the print media 114 when the printing assembly 112 performs the printing operation on the print media 114 in case of the thermal transfer printer. Alternatively, the platen roller assembly 126 may be configured for moving only the print media 114 (such as a label 134) through the printing assembly 112 in case of the direct transfer printer.

As an example, the transport rate of the print media 114 can be adjusted based on a ratio of length on a first image as instructed by a print command and length on the first image as observed from digital representation of the first image. In some embodiments, the transport rate of the print media 114 may depend on a ratio of width of the first image as instructed by the print command over the width of the first image as observed from the digital representation of the first image. Additionally, or alternatively, the transport rate of the print media 114 may be synchronized with the activation of the printing assembly 112 by adjusting strobe duration and/or start times for the print elements. In some embodiments, adjusting stepping rate for the stepper motor may depend on the error value being at least greater than the threshold value. Similarly, in some embodiments, adjusting the strobe duration and or start time for the print elements may depend on the error value being at least greater than the threshold value. As examples, the threshold may be selected based on a quality specification or other parameters, or overall stainability of an indicia. In some embodiments, a threshold may correspond to an error value of greater than 0.1%, 0.5%, 1.0%, 1.5%, 2.0%, 2.5%, 2.0%, 2.5%, 4.0%, 4.5%, 5.0%, or any other suitable threshold which may be selected by those skilled in the art.

Still referring to the combination of the first view 100A, the second view 100B, and the third view 100C of FIG. 1, there is further shown a printer verifier 128 comprising an imaging module 130 in cooperation with a verifier platform 132. As shown in first view 100A, the imaging module 130 is in an open, non-operating position in which the imaging module 130 is moved away from the verifier platform 132, for example during print media 114 changes. As shown in the second view 100B and the third view 100C, the imaging module 130 is in a closed, operating position opposite the verifier platform 132. The printed print media 114 (i.e., with the machine-readable symbol, such as a barcode, to be verified) may be configured to be supported on the verifier platform 132 in a narrow slot defined by the closed, non-operating imaging module 130 and the verifier platform 132 during the verification and calibration process. In some embodiments, the printer verifier 128 may instruct the platen roller assembly 126 to retract the print media 114 to print diagnostic information in case of an error or a defect, such as print quality defect, platen roller defect, printhead defect, and/or the like.

The printing assembly 112, that is engaged with the platen roller assembly 126, may include further components, as described in detail in following figures. The printing assembly 112 may be pivotably mounted in the thermal printer 100. The printing assembly 112 forms a unit or module which is bolted to the casting body 102 to secure the printing assembly 112 within the thermal printer 100.

Still referring to the first view 100A in FIG. 1, there is shown the casting body 102 of the thermal printer 100 including an assembly 136 with, for example, a display 138 for presenting the current status of the thermal printer 100 and a keypad 140 with function buttons 142 that may be configured to perform various typical printing functions (e.g., cancel print job, advance print media, and the like) or be programmable for the execution of macros containing preset printing parameters for a particular type of print media. The assembly 136 may display commands and the parameters of operation in multiple languages.

Although not shown in FIG. 1, the thermal printer 100 may further include electrical and drive components secured to the opposite side of the central support member of the casting body 102. The electrical and drive components may include a stepper motor assembly, an electronic circuitry, and an electric drive assembly that are secured to the central support member on the side opposite to the printing components. The electronic circuitry is in the form of circuit boards, which may be installed in the thermal printer 100 by sliding the circuit boards through an opening, formed in the casting body 102. The circuit boards may be chosen to suit a specific printing operation to be performed. For example, the electronic circuitry may be changed for different communications interfaces. Alternatively, software can be downloaded via a communications port to control a specific printing application. The casting body 102 may further include a mounting location that may be configured to receive the stepper motor assembly.

Figure 2A:
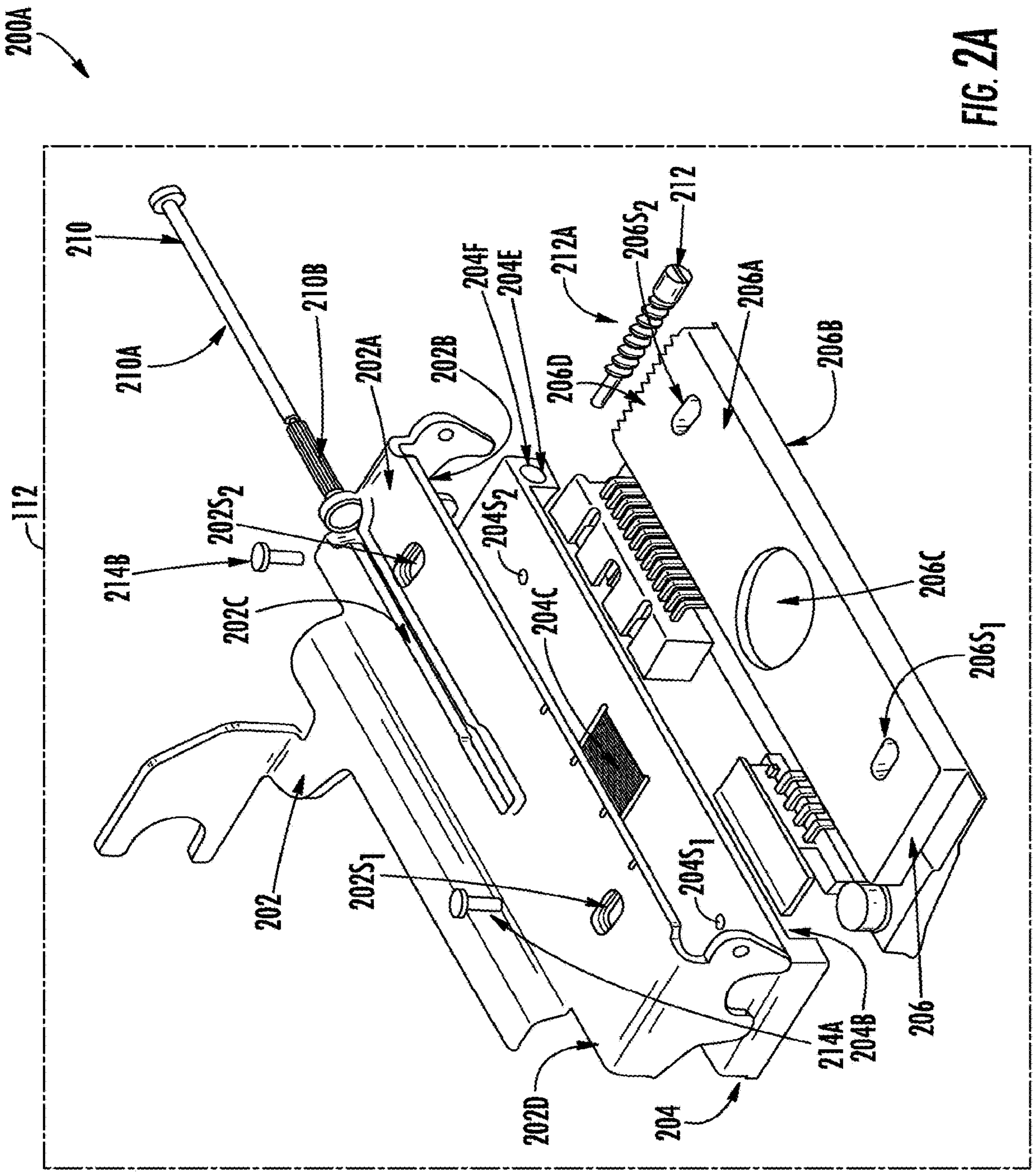
FIG. 2A illustrates a perspective view of the printing assembly comprising various components, in accordance with one or more embodiments described herein.
Figure 2B:
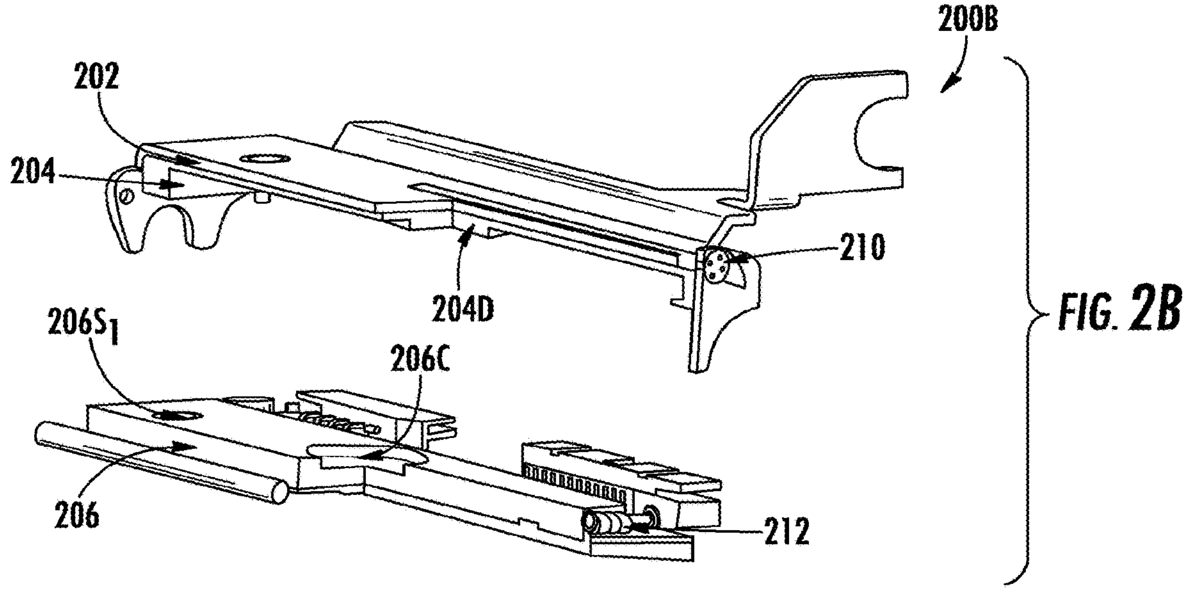
FIG. 2B illustrates a perspective exploded and cut-through view illustrating the printing assembly, in accordance with one or more embodiments described herein.
Figure 2C:
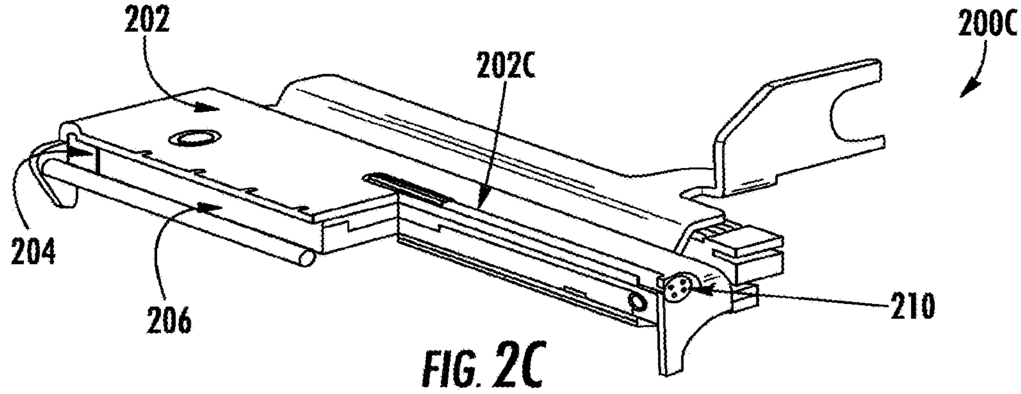
FIG. 2C illustrates a perspective cut-through view illustrating the printing assembly in the locked state, in accordance with one or more embodiments described herein.
Figure 2D:
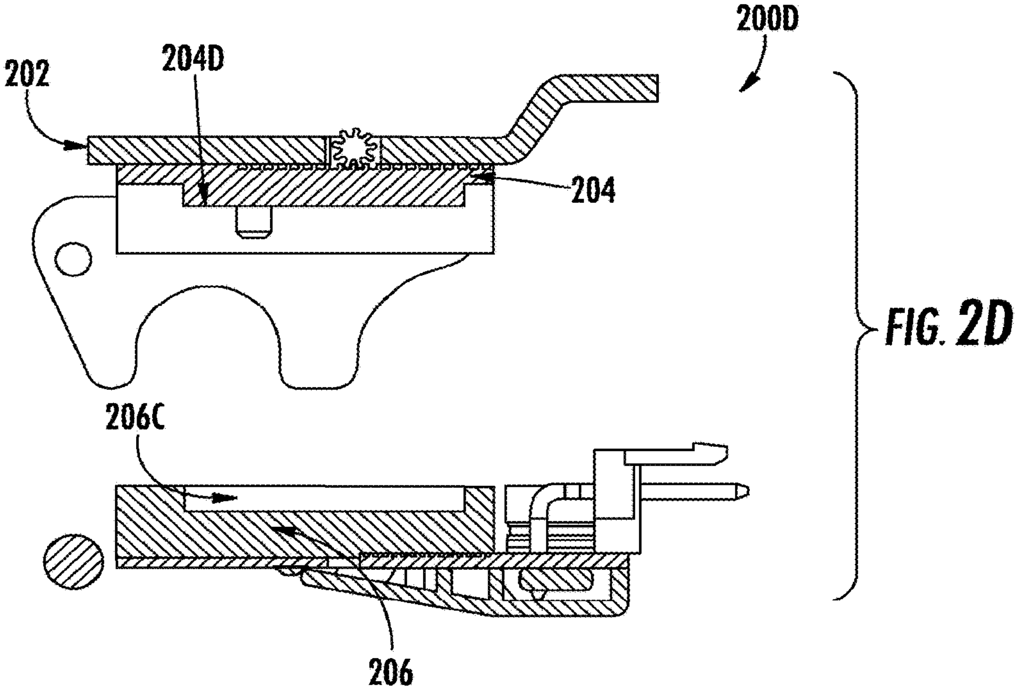
FIG. 2D illustrates exemplary dimensions of a protrusion of the alignment adjuster that is received by a groove of the printhead, in accordance with one or more embodiments described herein.

FIG. 2A illustrates a perspective view 200A of the printing assembly 112 comprising various components, in accordance with one or more embodiments described herein. FIG. 2B illustrates a perspective exploded and cut-through view 200B illustrating the printing assembly 112, in accordance with one or more embodiments described herein. FIG. 2C illustrates a perspective cut-through view 200C illustrating the printing assembly 112 in the locked state, in accordance with one or more embodiments described herein. FIG. 2D illustrates exemplary dimensions of the protrusion 204D of the alignment adjuster 204 that is received by the groove 206C of the printhead 206, in accordance with one or more embodiments described herein.

Referring to FIG. 2A, the printing assembly 112 is shown to be comprising a printhead bracket 202, an alignment adjuster 204, a printhead 206, and a plurality of fasteners, such as a lateral adjustment fastener 210, a rotational adjustment fastener 212, and set of additional fastener 214.

The printing assembly 112 forms a component unit or module which is bolted to support housing, such as the central support member, to secure the printing assembly 112 within the thermal printer 100.

The printhead bracket 202 may be secured to the central support member by attachment means, such as screws that are positioned within slots (not shown) formed in the printhead bracket 202. The printhead bracket 202 includes a pair of pivot members which are slidably positioned in vertical slots in a printhead pivot (not shown). As the printhead bracket 202 is pivoted towards the printhead mount and the media positioned within the printing assembly 112, the printhead bracket 202 engages the engagement member of the central support member. The engagement between the printhead bracket 202 and the engagement member cams the pivot members upwardly in the vertical slots to lift the backend of the printhead bracket 202 to allow for substantially parallel closure of the printhead bracket 202 onto the printhead mount.

The printhead bracket 202 has a first upper lateral surface 202A, a first lower lateral surface 202B, and a longitudinal channel 202C parallel to a longitudinal edge 202D of the printhead bracket 202. Cross-sectional dimensions of the longitudinal channel 202C may be sufficient to provide a suitable clearance for the lateral adjustment fastener 210.

The alignment adjuster 204 has a second upper lateral surface 204A and a second lower lateral surface 204B. The second upper lateral surface 204A of the alignment adjuster 204, which is adjacent to the first lower lateral surface 202B of the printhead bracket 202, provides a gear rack 204C. Further, the second lower lateral surface 204B of the alignment adjuster 204 provides a protrusion 204D, as shown in FIG. 2B. The alignment adjuster 204 further includes a slot 204E along a transverse edge 204F of the alignment adjuster 204.

The printhead 206 has a third upper lateral surface 206A and a third lower lateral surface 206B. The third upper lateral surface 206A of the printhead 206 is adjacent to the second lower lateral surface 204B of the alignment adjuster 204. The third upper lateral surface 206A of the printhead 206 provides a groove 206C configured to receive the protrusion 204D provided on the second lower lateral surface 204B of the alignment adjuster 204. The third lower lateral surface 206B of the printhead 206 includes means for performing a print operation, for example at least one burn line having a plurality of heating elements configured to perform the printing operation on the print media 114.

The plurality of fasteners may comprise at least one of the lateral adjustment fastener 210, the rotational adjustment fastener 212, and the set of additional fasteners 214. The lateral adjustment fastener 210 is arranged laterally on the second upper lateral surface 204A of the alignment adjuster 204 through the longitudinal channel 202C provided in the printhead bracket 202. The lateral adjustment fastener 210 has a shaft 210A and a pinion 210B towards an end of the shaft 210A. The pinion 210B is configured to be engaged with the gear rack 204C provided on the second upper lateral surface 204A of the alignment adjuster 204, as shown in FIG. 2B.

The rotational adjustment fastener 212 is received in the slot 204E of the alignment adjuster 204. The rotational adjustment fastener 212 has a rotational worm shaft 212A. The rotational worm shaft 212A is configured to be engaged with a toothed edge 206D of the printhead 206 provided on a transverse edge of the printhead 206, as shown in FIG. 2B.

The set of additional fasteners 214A and 214B is received in a set of slots (202$S_1$, 204$S_1$ and 206$S_1$) and (202$S_2$, 204$S_2$, and 206$S_2$), respectively, aligned in parallel in each of the printhead bracket 202, the alignment adjuster 204, and the printhead 206, respectively. The set of additional fasteners 214A and 214B fastens the alignment adjuster 204 between the printhead bracket 202 and the printhead 206. The set of additional fasteners is manipulated according to one of a first adjustment or a second adjustment. In an embodiment, the printing assembly 112 is unlocked in accordance with the first adjustment in a first direction, such as counterclockwise or upward direction. In another embodiment, the printing assembly 112 is locked in accordance with the second adjustment in a second direction, such as clockwise or downward direction.

In an embodiment, the manipulation of at least one of the lateral adjustment fastener 210, the rotational adjustment fastener 212, and the set of additional fasteners 214A and 214B may be performed by a user/operator by use of various tools. For example, in some embodiments, the lateral adjustment fastener 210 and/or rotational adjustment fastener 212 are/is configured to receive a screwdriver, hex key, torque screw driver, flat head screw driver, Philips-head, and the like, for manipulation.

Figure 4A:
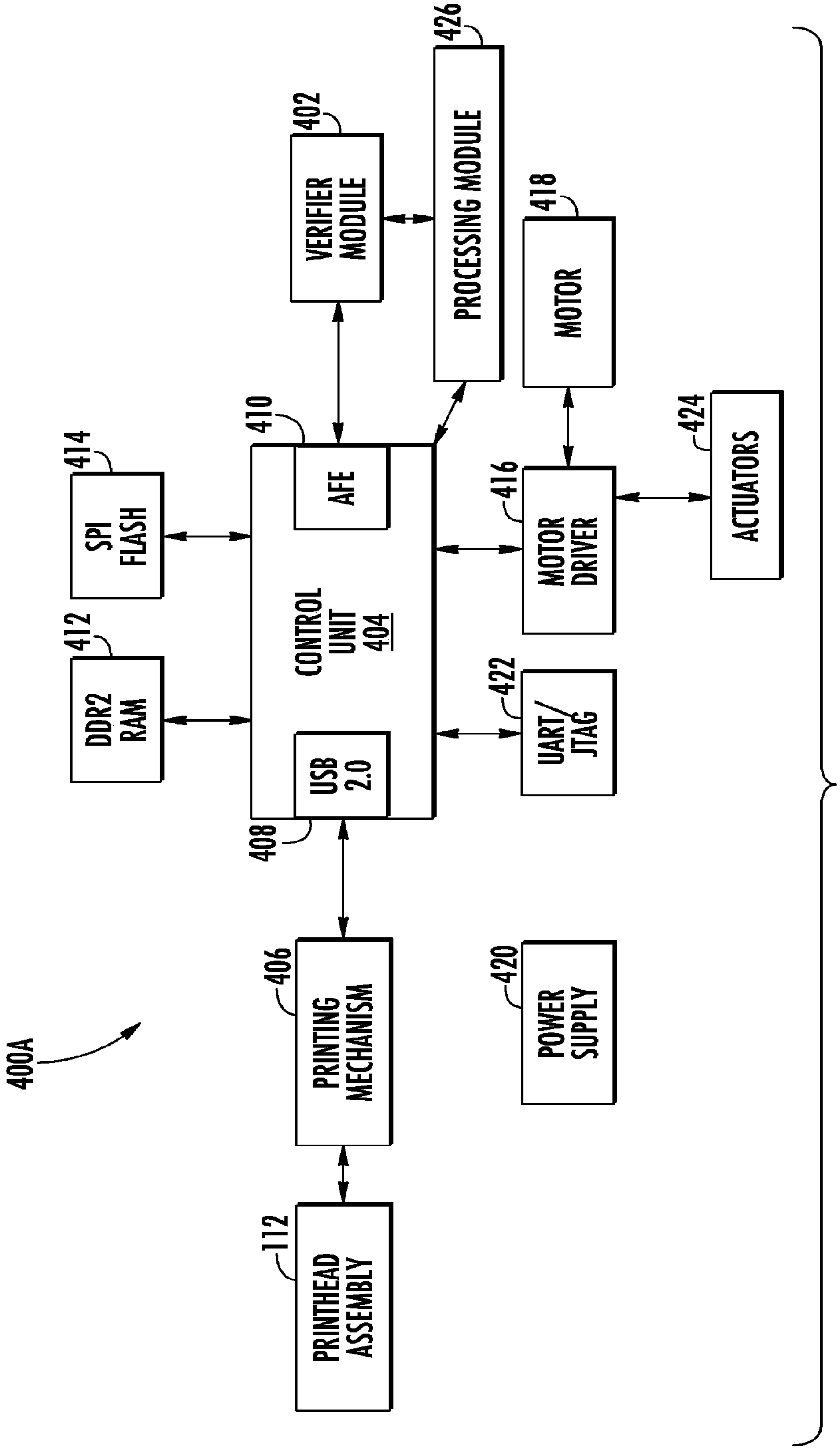
FIG. 4A is a block diagram showing an example embodiment of a printer including a verifier module in accordance with some example embodiments described herein.

In another embodiment, a control device, such as a control unit 404 as illustrated in FIG. 4A, may be configured to activate various actuators, such as a plurality of actuators 424 as illustrated in FIG. 4A, based on an input signal generated by a processor, such as a processing module 426 as illustrated in FIG. 4A. The actuators may be configured to manipulate at least one of the lateral adjustment fastener 210, the rotational adjustment fastener 212, and the set of additional fasteners 214A and 214B to automatically align the printhead 206 without manual intervention.

Such manipulation is performed to change the alignment of the various components of the printing assembly 112 from a first alignment to a second alignment, such that print quality of the printing assembly 112 is improved, for example to exceed a threshold value. Once the components of the printing assembly 112 is aligned to the second alignment, the set of additional fasteners 214A and 214B are received and/or adjusted in the set of slots (202$S_1$, 204$S_1$ and 206$S_1$) and (202$S_2$, 204$S_2$, and 206$S_2$), respectively. Accordingly, the state of the printing assembly 112 is changed to the locked state, as illustrated in the perspective cut-through view 200C in FIG. 2C.

Referring to FIG. 2D, there is illustrated exemplary dimensions of the protrusion 204D of the alignment adjuster 204 that is received by the groove 206C of the printhead 206. In an example embodiment, the diameter of the protrusion 204D may be 19.8 mm and the thickness of the protrusion may be 1.8 mm. Further, the diameter of the groove 206C may be 20 mm and the depth of the groove 206C may be 1.9 mm. It should be appreciated that, in other embodiments, alternative measurements may be provided. For example, the diameter of the groove 206C may vary within a range of 10 mm to 70 mm (as long as there is sufficient guide). Further, the depth of the groove 206C may be as low as 1 mm, and for example may vary within a range of 1 mm to the depth of the set of slots 206$S_1$ and 206$S_2$, (as long as there is sufficient guide).

Figure 3A:
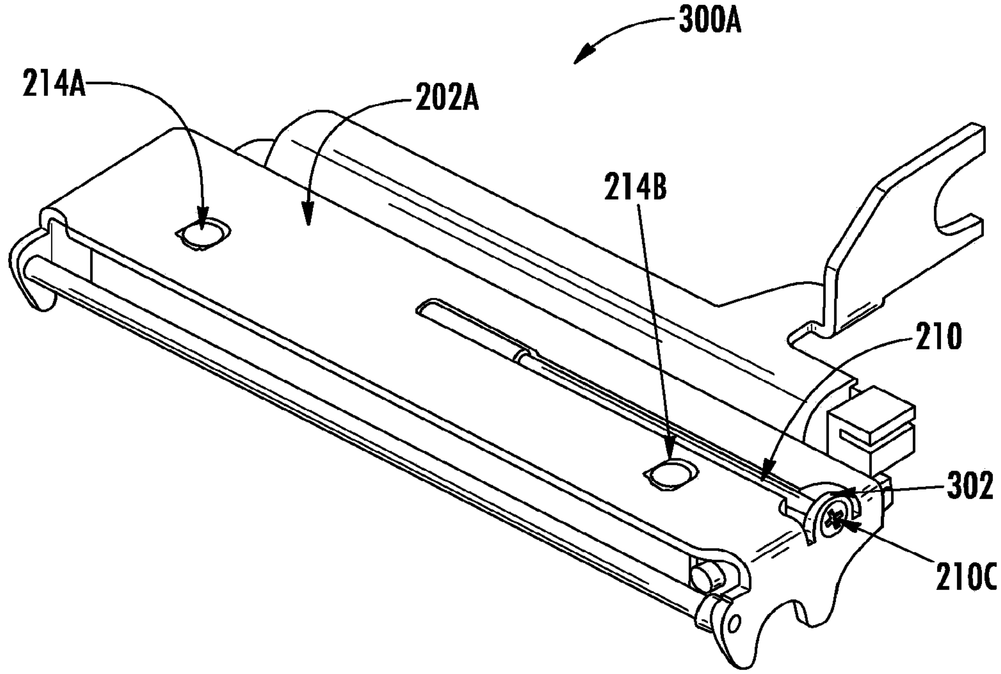
FIGS. 3A and 3B are perspective views illustrating engagement of plurality of fasteners when the printing assembly is in a locked state, in accordance with one or more embodiments described herein.
Figure 3B:
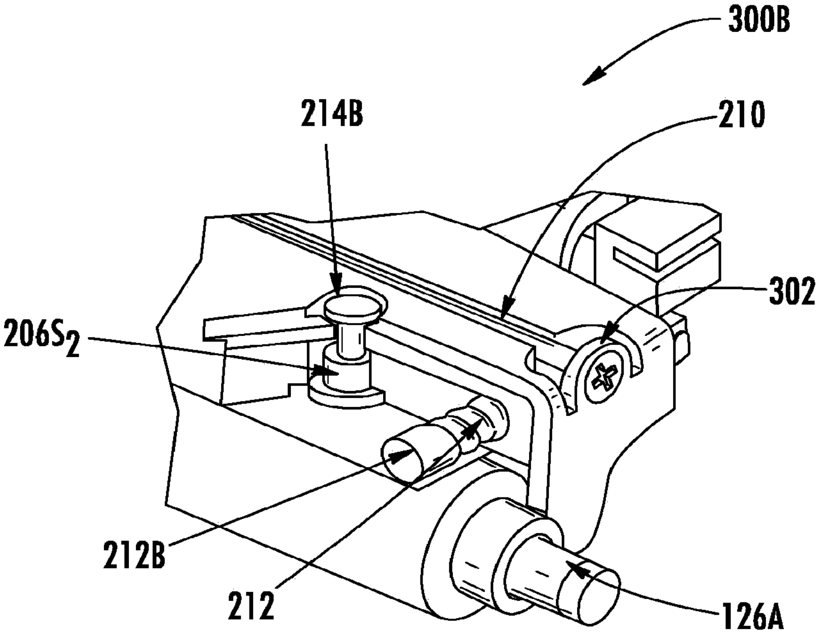
Figure 3C:
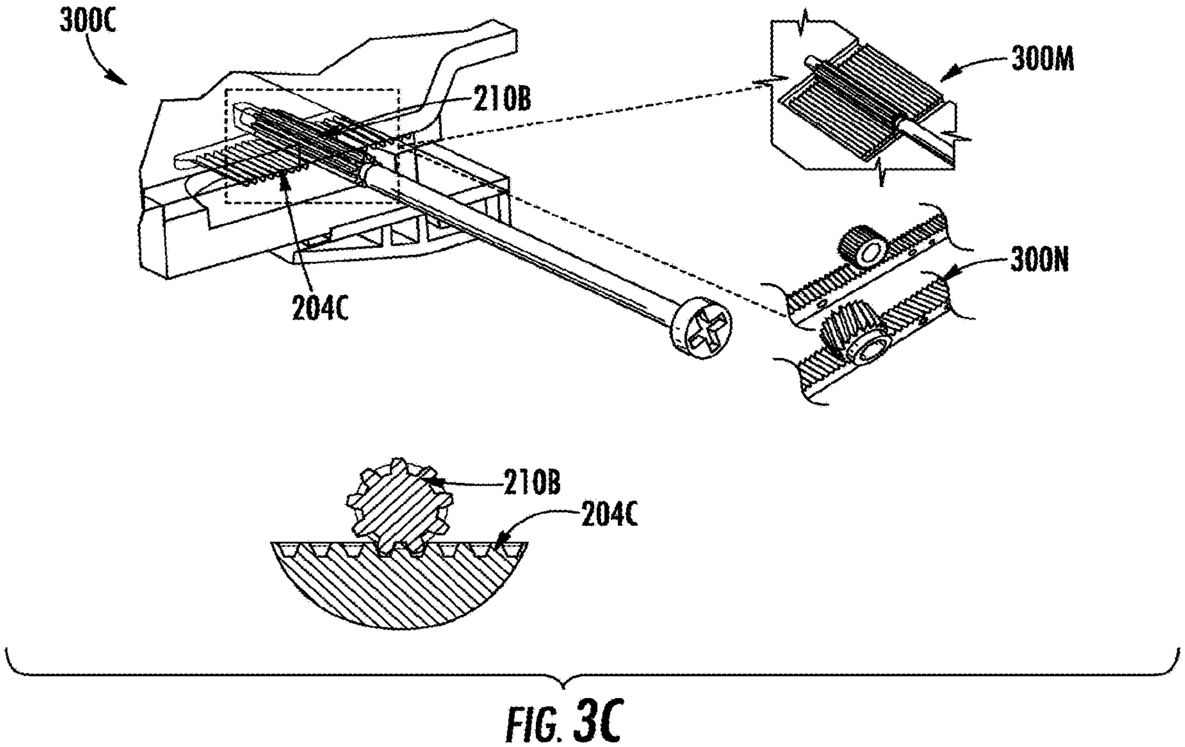
FIGS. 3C and 3D are detailed perspective views illustrating engagement of plurality of fasteners with other members of the printing assembly, in accordance with one or more embodiments described herein.
Figure 3D:
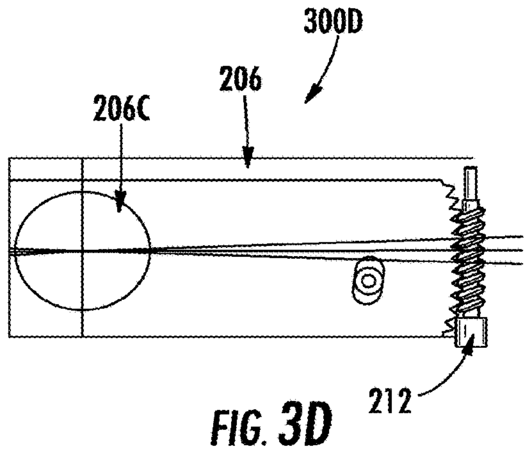

FIGS. 3A and 3B are perspective views 300A and 300B, respectively, illustrating engagement of plurality of fasteners when the printing assembly 112 is in the locked state, in accordance with one or more embodiments described herein. FIGS. 3A and 3B are described in conjunction with FIGS. 3C and 3D. FIGS. 3C and 3D are detailed perspective views 300C and 300D, respectively, illustrating engagement of plurality of fasteners with other members of the printing assembly 112, in accordance with one or more embodiments described herein.

Referring to FIG. 3A, the lateral adjustment fastener 210 is illustrated to be arranged laterally on the second upper lateral surface 204A of the alignment adjuster 204 through the longitudinal channel 202C provided in the printhead bracket 202. The lateral adjustment fastener 210 is secured with the printhead bracket 202 through a ring 302 provided by the printhead bracket 202. The plane of the ring 302 is parallel to the transverse edge of the printhead bracket 202. The head portion 210C of the lateral adjustment fastener 210 may be provided with defined grooves, such as straight, cross-shaped or star-shaped grooves, to aid a user to manipulate the lateral adjustment fastener 210 for suitable lateral alignment of the printhead 206. According to the above arrangement, the pinion 210B of the lateral adjustment fastener 210 engages with the gear rack 204C provided on the second upper lateral surface 204A of the alignment adjuster 204.

In accordance with an example embodiment, as illustrated in FIG. 3C, the pitch of the gear rack 204C may be 0.9 mm and the teeth height may be 0.44 mm. The Pitch Circle Diameter (PCD) of the pinion 210B may be diameter 2.6 mm and the number of teeth of the pinion 210B may be 9. Further, the perimeter of the pinion 210B may be 8.17 mm. It should be appreciated that, in other embodiments, alternative measurements may be provided. For example, the PCD of the pinion 210B may vary within a range of 2.6 mm to 16 mm, and may be almost the same to thickness of the heatsink of the printhead 206.

Accordingly, each mm of movement may be equivalent to 0.023 degree and one turn of the lateral adjustment fastener 210 may be equivalent to 8.17 mm of lateral movement. Thus, is the resolution of the lateral adjustment fastener 210. It may be noted that the above example embodiment is in accordance with merely one example embodiment. Other example embodiments may also include different measurements based on the level of resolution required, without deviation from the scope of the disclosure. It may be further noted that although in most of the illustrations, the pinion 210B and the gear rack 204C correspond to a spur gear assembly, as illustrated in view 300M, in other embodiments alternative arrangements may be utilized. In other embodiments, for example, the pinion 210B and the gear rack 204C may correspond to a helical gear assembly also, as illustrated in view 300N, without deviating from the scope of the disclosure. Accordingly, the specifically illustrated configurations should not be construed as limiting the scope of the disclosure herein.

In an embodiment, a clockwise manipulation may be provided to the lateral adjustment fastener 210 either manually or via one or more of actuators 424. The clockwise manipulation of the lateral adjustment fastener 210 causes a lateral movement where the lateral movement is a forward movement of the printhead 206 and the alignment adjuster 204 with respect to the printhead bracket 202. Alternatively, an anticlockwise manipulation may also be provided to the lateral adjustment fastener 210 either manually or via the plurality of actuators 424. The anti-clockwise manipulation of the lateral adjustment fastener 210 causes a lateral movement where the lateral movement is a backward movement of the printhead 206 and the alignment adjuster 204 with respect to the printhead bracket 202. Thus, a specific type of manipulation of the lateral adjustment fastener 210 by a specific degree of lateral movement may change the lateral alignment of the printhead 206 from a first alignment to a second alignment, as described in FIG. 6B.

Referring back to FIG. 3A, the rotational adjustment fastener 212 is illustrated to be received in a slot 204E along a transverse edge 204F of the alignment adjuster 204. Accordingly, through the slot 204E, the rotational worm shaft 212A of the rotational adjustment fastener 212 may be configured to be engaged with a toothed edge provided on a transverse edge of the printhead 206, as illustrated in detailed view 300D in FIG. 3D. The rotational adjustment fastener 212 may be configured to provide a rotational movement to the alignment adjuster 204 and the printhead 206, from the first alignment to the second alignment. The rotational movement may be provided about the protrusion 204D of the alignment adjuster 204 engaged with the groove 206C of the printhead 206. The head portion 212B of the rotational adjustment fastener 212 may be provided with defined grooves, such as straight, cross-shaped or star-shaped grooves, to aid a user to manipulate the rotational adjustment fastener 212 for suitable rotational alignment of the printhead 206.

In accordance with example embodiment, as illustrated in FIG. 3D, the number of teeth of the toothed edge of the printhead 206 may be 12. The PCD may be 111.7 mm, and the perimeter may be 350.92 mm. Regarding the rotational worm shaft 212A, the pitch may be 2.25 mm, and one mm lateral may be 160 degree of screw turn. Accordingly, the perimeter/pitch may be 155.963, one turn of screw may be 2.308 rotational degree, and each mm movement may be 1.03 degree screw turn. It should be appreciated that the example embodiment and measurements above are merely one example embodiment. Other embodiments may also be possible based on the level of resolution required, without deviation from the scope of the disclosure.

In an embodiment, a clockwise manipulation may be provided to the rotational adjustment fastener 212 either manually or via one or more of actuators 424. Accordingly, the clockwise manipulation of the rotational adjustment fastener 212 causes a lateral movement of the rotational adjustment fastener 212, where the lateral movement is a forward movement that may provide a clockwise rotational movement to the printhead 206 with respect to the alignment adjuster 204 and printhead bracket 202. Alternatively, an anticlockwise manipulation may also be provided to the rotational adjustment fastener 212 either manually or via one or more of actuators 424. Accordingly, the anticlockwise manipulation of the rotational adjustment fastener 212 causes a lateral movement of the rotational adjustment fastener 212, where the lateral movement is a backward movement that may provide an anti-clockwise rotational movement to the printhead 206 with respect to the alignment adjuster 204 and printhead bracket 202. Thus, a specific type of manipulation of the rotational adjustment fastener 212 by a specific degree of lateral movement may change the rotational alignment of the printhead 206 from a first alignment to a second alignment, as described in FIG. 6C.

Referring back to FIG. 3A, the set of additional fasteners 214A and 214B is illustrated to be received in the set of slots (202$S_1$, 204$S_1$ and 206$S_1$) and (202$S_2$, 204$S_2$, and 206$S_2$), respectively, aligned in parallel in each of the printhead bracket 202, the alignment adjuster 204, and the printhead 206, respectively. As illustrated in FIG. 2A, the slots 202$S_1$ and 202$S_2$ of the printhead bracket 202 may be longitudinal in shape. The longitudinal shape of the slots 202$S_1$ and 202$S_2$ may provide sufficient clearance to the lateral and/or the rotational movement when corresponding lateral adjustment fastener 210 and the rotational adjustment fastener 212 are manipulated when the printing assembly 112 is in the unlocked state. Similarly, the slots 206$S_1$ and 206$S_2$ of the printhead 206 may also have a defined shape. In an embodiment, as illustrated on FIGS. 2A and 2B, the slots 206$S_1$ and 206$S_2$ of the printhead 206 may be longitudinal in shape. However, in other embodiments, the slots 202$S_1$, 202$S_2$, 206$S_1$, and/or 206$S_2$ may be have other profiles or shapes. For example, in another embodiment, as illustrated on FIG. 3B, the slots 206$S_1$ and 206$S_2$ of the printhead 206 may have a protruding profile.

The set of additional fasteners 214A and 214B may be manipulated according to one of a first adjustment or a second adjustment. In an embodiment, as illustrated in FIGS. 2A and 2B, the state of the printing assembly 112 may change to an unlocked state upon the first adjustment of the set of additional fasteners 214A and 214B in a first direction, such as anticlockwise direction or upward/outward direction. In another embodiment, as illustrated in FIGS. 3A and 3B, the state of the printing assembly 112 may change to a locked state upon the second adjustment of the set of additional fasteners 214A and 214B in a second direction, such as clockwise direction or downward/inward direction.

FIG. 4A is a block diagram showing an example embodiment of the thermal printer 100, specifically printing apparatus 400A, in accordance with some example embodiments described herein. The printing apparatus 400A of FIG. 4A includes the control unit 404, a printing mechanism 406, and a verifier module 402 (comprising a contact image sensor (CIS) device or other type of linear sensor array). The CIS devices may be used for print image verification, for example by using the motion of the print media 114 as it is being transported through the verifier module 402 to generate a two-dimensional grayscale image of the print media 114. In some examples, CIS devices have certain aperture sizes that are usually needed for testing certain barcodes. Thus, some verification standards may require that information regarding the aperture size of the verifier module 402 be made known when the barcode grade is reported. Therefore, the effective aperture dimension of the CIS device may greatly affect how the verifier module 402 grades the barcodes.

In accordance with said example embodiment, the control unit 404 includes a USB 2.0 interface 408 for enabling communication with the printing mechanism 406 and an analog front end (AFE) interface 410 for enabling communication with the verifier module 402. The control unit 404 may also be connected to a memory device, such as DDR2 RAM 412 and SPI flash 414. The control unit 404 is also connected to a universal asynchronous receiver/transmitter (UART) joint test action group (JTAG) interface 422, a motor driver 416, and the plurality of actuators 424. It may be noted that the interfaces described above are merely for exemplary purposes and should not be construed to be limiting the disclosure. Other interfaces known in the art providing similar functionality may also be implemented without any deviation from the scope of the disclosure.

The motor driver 416 is configured to drive a motor 418 that is used to feed the print media through the printer. The plurality of actuators 424 may be configured to provide actuation signals to one or more hardware components, such as the various fasteners of the thermal printer 100. The control unit 404 is also connected to the processing module 426, the processing module 426 being further connected to the verifier module 402. A power supply 420 supplies power to the control unit 404, the printing mechanism 406, the verifier module 402, the motor driver 416, the plurality of actuators 424 and other components of the thermal printer 100.

In accordance with an example embodiment, the verifier module 402, in conjunction with the processing module 426, may be configured to detect print quality of the printing operation on the print media 114 when the printhead 206 is aligned at a first alignment. The first alignment may correspond to a location, position and/or orientation of one or more burn lines of the printhead 206 with respect to the platen roller 126A. At the first alignment, the print quality of the printing operation may be less than the threshold value, or in other words, not an acceptable print quality.

The verifier module 402, in conjunction with the processing module 426, may be configured to determine that the detected print quality of the printing operation is less than the threshold value. Accordingly, the processing module 426 may be configured to generate an input signal based on the determination of the detected print quality of the printing operation being less than the threshold value. The processing module 426 may communicate the generated input signal to the control unit 404.

Based on the input signal received from the processing module 426, the control unit 404 may be configured to activate the plurality of actuators 424 through the motor driver 416. The activated plurality of actuators 424 may be configured to manipulate the plurality of fasteners to align the printhead 206 at the second alignment. The manipulation of the plurality of fasteners may include manipulation of at least one of the lateral adjustment fastener 210 and/or the rotational adjustment fastener 212 to align the printhead 206 of the printing assembly 112 at the second alignment.

Manipulation of the lateral adjustment fastener 210 provides a lateral movement to the alignment adjuster 204 and the printhead 206. Manipulation of the rotational adjustment fastener 212 provides a rotational movement to the printhead 206. At the second alignment, the print quality of the printing operation performed by the printhead 206 exceeds the threshold value.

In accordance with another example embodiment, the processing module 426 based on an input received from the verifier module 402, may be configured to determine a deviation value of a baseline of indicia grading with respect to the boundary of the print media 114 when the printhead 206 is aligned at the first alignment. For example, the verifier module 402 may determine such deviation value associated with one or more decodable indicia/symbol(s) by measuring an angle of incidence of illumination relative to the plane of the symbol. The processing module 426 may be further configured to determine a lateral movement value, a rotational movement value, or both for alignment of the printhead 206 based on the determined deviation value. For example, the determined deviation value for the baseline of indicia grading with respect to the boundary of the print media 114 (when the printhead 206 is aligned at the first alignment) may be +2 mm of lateral movement, and −0.2 degrees of rotational movement with respect to the reference values. Accordingly, the processing module 426 may determine the correction for deviation values in the reverse directions but of the same absolute value. For example, the processing module 426 may determine the correction for the lateral movement to be −2 mm corresponding to the lateral movement value, and the correction for the rotational movement to be +0.2 degrees corresponding to the rotational movement value, based on corresponding deviation values.

Figure 4B:
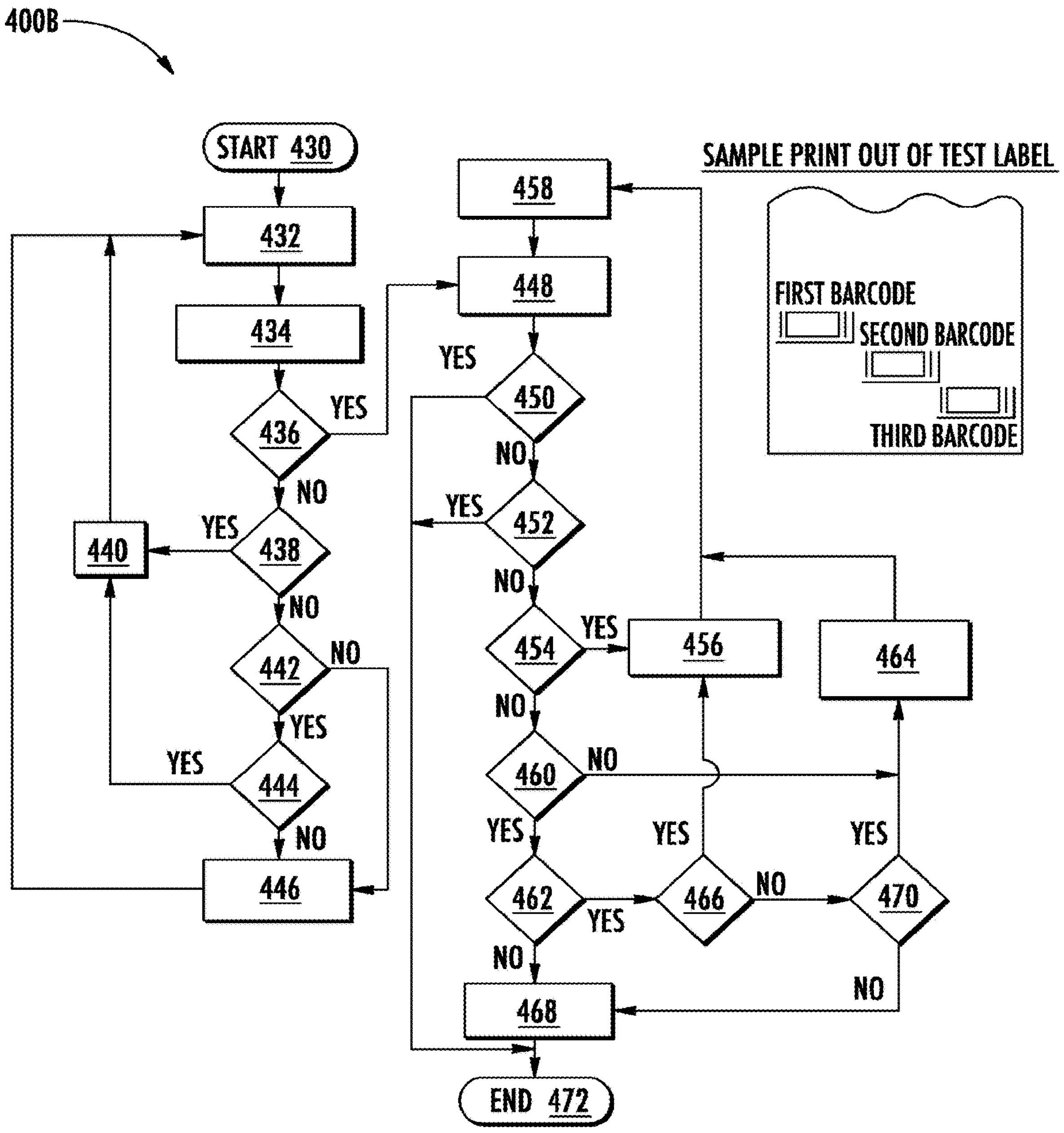
FIG. 4B is a flow diagram illustrating an example method for determining the lateral movement value, the rotational movement value, or both for the alignment of the printhead, in accordance with an embodiment described herein.

In an example embodiment, the processing module 426 may be configured to determine the lateral movement value, the rotational movement value, or both for the alignment of the printhead 206, based on a flow diagram 400B in FIG. 4B, in accordance with an embodiment described herein.

It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described herein may be embodied by computer program instructions. In this regard, the computer program instructions which embody the described procedures may be stored by the memory device, such as DDR2 RAM 412 and SPI flash 414, of the printing assembly 112 employing an embodiment of the present disclosure and executed by processing module 426 and the verifier module 402 in the printing assembly 112.

As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a specific manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 4B, when executed, convert a computer or processing circuitry into a specific machine configured to perform an example embodiment of the present invention. Accordingly, the operations of FIG. 4B define algorithms for configuring a computer or processor, to perform an example embodiment. In some cases, a general purpose computer may be provided with an instance of the processor which performs the algorithms of FIG. 4B to transform the general purpose computer into a specific machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Referring to FIG. 4B, the flow diagram 400B illustrating the example method for determining the lateral movement value, the rotational movement value, or both for the alignment of the printhead, in accordance with an embodiment described herein, starts at operation 430 and ends at operation 472.

Turning to operation 432, the printer may include means, such as the printhead 206*a* aligned at a first alignment, for printing a test label. The test label may include one or more decodable indicia and/or reference symbol(s) for use in determining print quality and/or a deviation value associated with printhead misalignment. For example, the test label may include three barcodes, such as a first, second and third barcode. The second barcode, positioned between the first and the third barcode, may facilitate the determination about the manipulation of the lateral adjustment fastener 210 in clockwise or anticlockwise direction. The first and the third barcode may facilitate the determination about the manipulation of the rotational adjustment fastener 212 in clockwise or anticlockwise direction.

Turning to operation 434, the printer may include means, such as the verifier module 402, for scanning a second barcode of the three barcodes printed by the printhead 206*a*. The printer may determine a deviation value (or a lateral deviation component of a deviation value) based on the second barcode.

Turning to operation 436, the printer may include means, such as the verifier module 402 in conjunction with the processing module 426, for determining whether print quality scoring for the second barcode is same or better than a set value (i.e. 3.0). In an embodiment, when the second barcode is same or better than a set value (i.e. 3.0), the control turns to operation 448. In an embodiment, when the second barcode is not same or better than the set value (i.e. 3.0), the control turns to operation 438.

Turning to operation 438, the printer may include means, such as the processing module 426, for determining whether current print job is the first print job. In an embodiment, when the current print job is the first print job, the control turns to operation 440. In an embodiment, when the current print job is not the first print job, the control turns to operation 442.

Turning to operation 440, the printer may include means, such as the control unit 404 in conjunction with the processing module 426 and the plurality of actuators 424, for manipulating the lateral adjustment fastener 210 in clockwise direction per set angle based on the determined deviation value. Control turns back to operation 432.

Turning to operation 442, the printer may include means, such as the verifier module 402 in conjunction with the processing module 426, for determining whether the print quality for the second barcode has increased, for example based on whether one or more quality parameters such as contrast value for the second barcode has increased based on comparison with a previous scanned value. In an embodiment, when the print quality for the second barcode has increased, for example when the contrast value for the second barcode has increased, the control turns to operation 446. In an embodiment, when the print quality for the second barcode has not increased, for example when the contrast value for the second barcode has not increased, the control turns to operation 444.

Turning to operation 444, the printer may include means, such as the processing module 426, for determining whether the previous manipulation was a clockwise manipulation. In an embodiment, when the previous manipulation was a clockwise manipulation, the control turns to operation 440. In an embodiment, when the previous manipulation was not a clockwise manipulation, the control turns to operation 446.

Turning to operation 446, the printer may include means, such as the control unit 404 in conjunction with the processing module 426 and the plurality of actuators 424, for manipulating the lateral adjustment fastener 210 in anti-clockwise direction per set angle based on the determined deviation value. Control passes back to operation 432.

Turning to operation 448, the printer may include means, such as the verifier module 402, for scanning a first and a third barcode of the three barcodes printed by the printhead 206*a*. The printer may determine a deviation value (or a rotational deviation value of a deviation value) based on the first and the third barcodes.

Turning to operation 450, the printer may include means, such as the verifier module 402 in conjunction with the processing module 426, for determining whether print quality scoring for the first and the third barcode is same or better than a set value (i.e. 3.0). In an embodiment, when the first and the third barcode is same or better than a set value (i.e. 3.0), the control turns to end operation 472. In an embodiment, when the first and the third barcode is not same or better than the set value (i.e. 3.0), the control turns to operation 452.

Turning to operation 452, the printer may include means, such as the verifier module 402 in conjunction with the processing module 426, for determining whether print quality scoring for the first and the third barcode is same. In an embodiment, when the first and the third barcode is same, the control turns to end operation 472. In an embodiment, when the first and the third barcode is not same, the control turns to operation 454.

Turning to operation 454, the printer may include means, such as the verifier module 402 in conjunction with the processing module 426, for determining whether the currently scanned first and the third barcode is first print job. In an embodiment, when the currently scanned first and the third barcode are part of a first print job, the control turns to operation 456. In another embodiment, when the currently scanned first and the third barcode are not part of the first print job, the control turns to operation 456.

Turning to operation 456, the printer may include means, such as the control unit 404 in conjunction with the processing module 426 and the plurality of actuators 424, for manipulating the rotational adjustment fastener 212 in clockwise direction per set angle based on the determined deviation value.

Turning to operation 458, the printer may include means, such as the printhead 206*a* aligned at a first alignment, for again printing the test label.

Turning to operation 460, the printer may include means, such as the verifier module 402 in conjunction with the processing module 426, for determining whether the print quality for the first barcode has increased, for example based on whether one or more quality parameters such as contrast value for the first barcode has increased based on comparison with a previous scanned value. In an embodiment, when the print quality for the first barcode has increased, for example when the contrast value for the first barcode has increased, the control turns to operation 462. In an embodiment, when the print quality for the first barcode has not increased, for example when the contrast value for the first barcode has not increased, the control turns to operation 464.

Turning to operation 464, the printer may include means, such as the control unit 404 in conjunction with the processing module 426 and the plurality of actuators 424, for manipulating the rotational adjustment fastener 212 in anti-clockwise direction per set angle based on the determined deviation value. Control turns back to operation 458.

Turning to operation 462, the printer may include means, such as the verifier module 402 in conjunction with the processing module 426, for determining whether the print quality for the third barcode has increased, for example based on whether one or more quality parameters such as contrast value for the third barcode has increased based on comparison with a previous scanned value. In an embodiment, when the print quality for the third barcode has increased, for example when the contrast value for the third barcode has increased, the control turns to operation 466. In an embodiment, when the print quality for the third barcode has not increased, for example when the contrast value for the third barcode has not increased, the control turns to operation 468.

Turning to operation 466, the printer may include means, such as the control unit 404 in conjunction with the processing module 426 and the plurality of actuators 424, for determining whether previous manipulation of the rotational adjustment fastener 212 in clockwise direction per set angle based on the determined deviation value. In an embodiment, when it is determined that the previous manipulation of the rotational adjustment fastener 212 was in clockwise direction per set angle based on the determined deviation value, control passes to operation 456. In another embodiment, when it is determined that the previous manipulation of the rotational adjustment fastener 212 was not in clockwise direction per set angle based on the determined deviation value, control passes to operation 470.

Turning to operation 468, the printer may include means, such as the processing module 426, for notifying an error. For example, the printer may print an error notice on print media, or otherwise display an error notification to a printer display associated with and/or connected to the printer. Control turns to end operation 472.

Turning to operation 470, the printer may include means, such as the control unit 404 in conjunction with the processing module 426 and the plurality of actuators 424, for determining whether previous manipulation of the rotational adjustment fastener 212 in anti-clockwise direction per set angle based on the determined deviation value. In an embodiment, when it is determined that the previous manipulation of the rotational adjustment fastener 212 was in anti-clockwise direction per set angle based on the determined deviation value, control passes to operation 464. In another embodiment, when it is determined that the previous manipulation of the rotational adjustment fastener 212 was in not in anti-clockwise direction per set angle based on the determined deviation value, control turns to operation 468.

It should be appreciated that, in some embodiments, the set angle for clockwise and/or anti-clockwise rotation of the lateral adjustment fastener 210 is the same as the set angle for clockwise and/or anti-clockwise rotation of the rotational adjustment fastener 212. In other embodiments, the set angle for clockwise and/or anti-clockwise rotation of the lateral adjustment fastener 210 is different from the set angle for clockwise and/or anti-clockwise rotation of the rotational adjustment fastener 212. Additionally or alternatively, in some embodiments, the set angle for clockwise rotation of the lateral adjustment fastener 210 is different from the set angle for anti-clockwise rotation of the lateral adjustment fastener 210, and/or the set angle for clockwise rotation of the rotational adjustment fastener 212 is different from the set angle for anti-clockwise rotation of the rotational adjustment fastener 212.

Based on the determined lateral movement value, the rotational movement value, or both for the alignment of the printhead, the processing module 426 may be further configured to generate an input signal. In the similar manner as described above, the control unit 404 may be configured to activate the motor driver 416, and in turn the plurality of actuators 424, based on the generated input signal received from the processing module 426. The activated plurality of actuators 424 may be configured to manipulate the plurality of fasteners to align the printhead 206 at the second alignment according to the lateral movement value, the rotational movement value, or both.

In an embodiment, the activated plurality of actuators 424 may be configured to continue manipulation of the plurality of fasteners to align the printhead 206 to attain one or more intermediate alignments according to the lateral movement value and/or the rotational movement value. At each of the one or more intermediate alignments, the printing assembly 112 may re-print and re-verify to determine when to stop the manipulation of the plurality of fasteners, for example based on the output of the verifier module 402 after re-printing and/or re-verifying. In case the verifier module 402 detects that the print quality of the printing operation is still below the threshold value at an intermediate alignment, the processing module 426 may determine what further adjustment is required via the plurality of fasteners. Accordingly, the processing module 426 may generate further input signals to cause the control unit 404 to control the manipulation of the plurality of fasteners, then re-print. The verifier module 402 may re-verify the print quality again to make a subsequent determination at the next intermediate alignment.

In an embodiment, the processing module 426 may be configured to allow the printing mechanism 406 to continue printing if the manipulation of the plurality of fasteners is sufficient to provide an acceptable print quality at the second alignment, which may be attained after one or more intermediate alignments. When the processing module 426 determines, that issues regarding the print quality are not correctible, the processing module 426 and the control unit 404 may be configured to discontinue the printing operation and may instruct a user, via a user output component or other output device, of the issue and/or how to correct the issues manually.

Whether configured by hardware, firmware/software methods, or by a combination thereof, the processing module 426 may include an entity capable of performing operations according to embodiments of the present disclosure. Thus, for example, when the processing module 426 is embodied as an application specific integrated circuit (ASIC), field programmable gate array (FPGA) or the like, the processing module 426 may include specifically configured hardware for conducting one or more operations described herein. Alternatively, as another example, when the processing module 426 is embodied as an executor of instructions, such as may be stored in the memory device, the instructions may specifically configure the processing module 426 to perform one or more algorithms and operations described herein.

Thus, the processing module 426 used herein may refer to a programmable microprocessor, microcomputer or multiple processor, chip or chips, that can be configured by software instructions or applications to perform a variety of functions, including the functions of the various embodiments described herein. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a non-volatile memory or a combination of volatile or non-volatile memory, such as flash memory. The memory can also be located internal to another computing resource (e.g., enabling computer readable instructions to be downloaded over the Internet or another wired or wireless connection).

Figure 5:
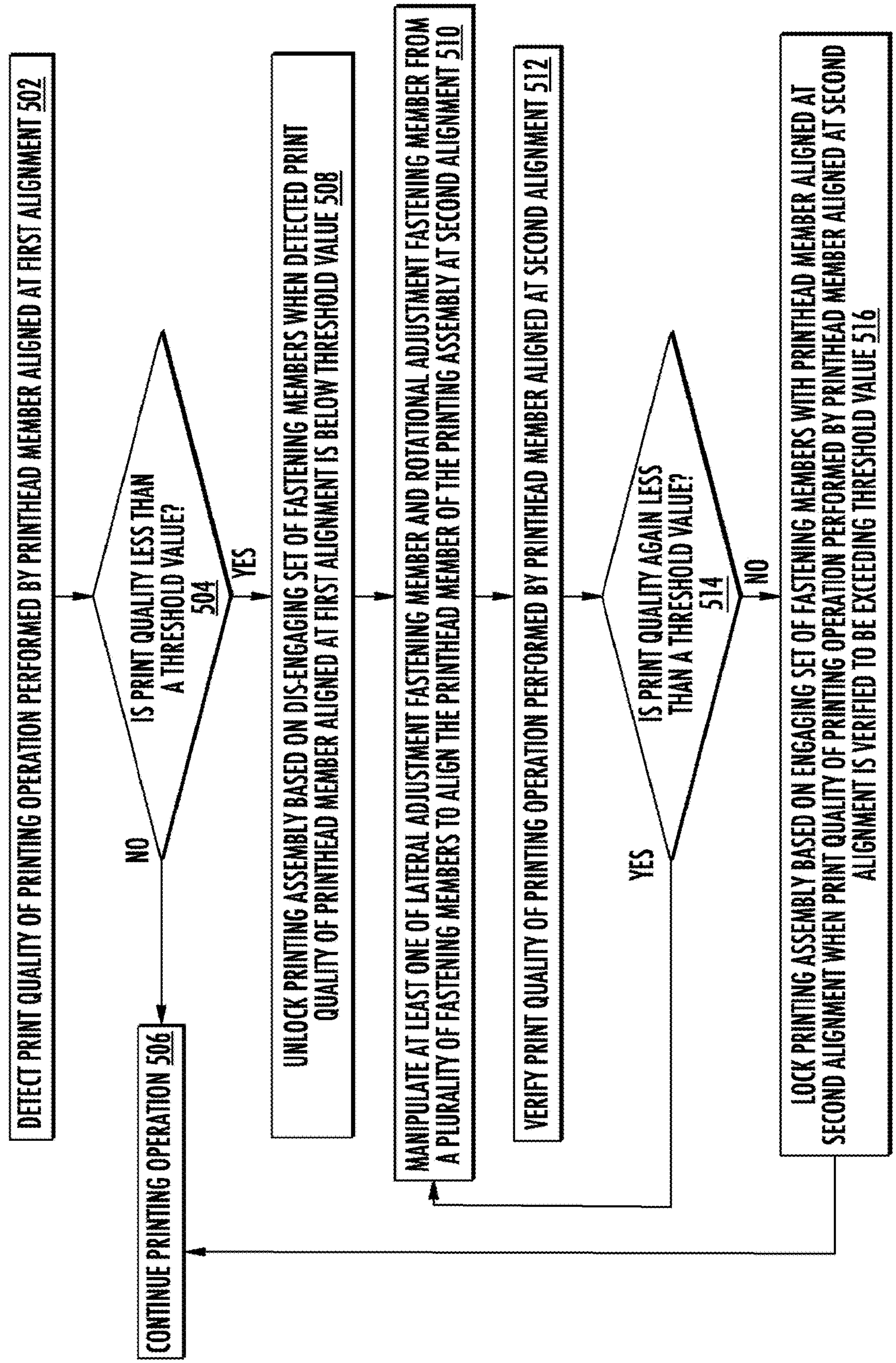
FIG. 5 is a flow diagram illustrating an example method for printhead alignment of a printing assembly, in accordance with an embodiment described herein.

FIG. 5 is a flow diagram illustrating example methods for printhead alignment in a printer including the printing assembly 112, in accordance with an embodiment described herein. FIG. 5 is described in conjunction with FIGS. 1-4B. Further, FIG. 5 is explained with an exemplary use case, in conjunction with illustrations provided in FIGS. 6A to 6C.

It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described herein may be embodied by computer program instructions. In this regard, the computer program instructions which embody the described procedures may be stored by the memory device, such as DDR2 RAM 412 and SPI flash 414, of the printing assembly 112 employing an embodiment of the present disclosure and executed by processing module 426 and the verifier module 402 in the printing assembly 112.

As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a specific manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 5, when executed, convert a computer or processing circuitry into a specific machine configured to perform an example embodiment of the present invention. Accordingly, the operations of FIG. 5 define algorithms for configuring a computer or processor, to perform an example embodiment. In some cases, a general purpose computer may be provided with an instance of the processor which performs the algorithms of FIG. 5 to transform the general purpose computer into a specific machine configured to perform an example embodiment.

Accordingly, blocks of the flowchart support combinations of means for performing the specified functions and combinations of operations for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

Turning to operation 502, the printer may include means, such as the verifier module 402 in conjunction with the processing module 426, for detecting a first print quality of a printing operation performed by a printhead, such as the printhead 206, aligned at a first alignment. In an embodiment, the first alignment may correspond to a misplaced location or disorientation of a burn line, for example a burn line positioned at the third lower lateral surface 206B of the printhead 206 with respect to the platen roller 126A. The burn line is positioned at the third lower lateral surface 206B of the printhead 206 with respect to the print media 114 and the platen roller 126A.

Typically, for an optimal print quality, the burn line is in such an alignment that the burn line is in direct and optimal contact with the print media 114 and the print media 114 is, in turn, in a direct and optimal contact with the platen roller 126A. At such an alignment, the optimal location and orientation of the burn line with respect to the platen roller 126A is along the vertical radial axis of the platen roller 126A. However, due to various factors, such as varying thickness of the print media 114, wear and tear of the burn line, and the like, the optimal alignment may be dislocated or disoriented resulting in the first alignment.

Figure 6A:
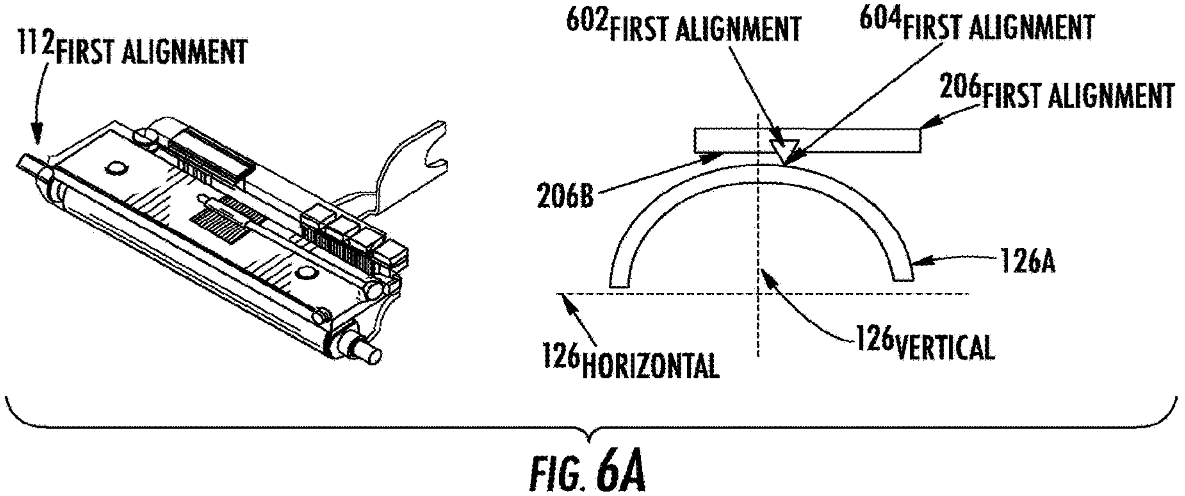
FIGS. 6A to 6C illustrate an exemplary alignment use case, in accordance with an embodiment described herein.

An example case of such first alignment is illustrated in FIG. 6A. As illustrated in FIG. 6A, the printing assembly 112 is shown to be at the first alignment, depicted by $\mathbf{112}_{First\ Alignment}$. Accordingly, printhead 206 is also at the first alignment, depicted by $\mathbf{206}_{First\ Alignment}$. Consequently, the location and orientation of the burn line $\mathbf{602}_{First\ Alignment}$ is misplaced to be at a point $\mathbf{604}_{First\ Alignment}$ which is deviating from the vertical radial axis $\mathbf{126}_{Vertical}$ of the platen roller 126A. In an example embodiment, the point $\mathbf{604}_{First\ Alignment}$ may be laterally misplaced along the web direction at a lateral distance away from the vertical radial axis $\mathbf{126}_{Vertical}$ of the platen roller 126A. Additionally, or alternatively, the point $\mathbf{604}_{First\ Alignment}$ may be angularly misplaced by an angle (for example in anticlockwise direction) from the horizontal radial axis $\mathbf{126}_{Horizontal}$ of the platen roller 126A.

Thus, at the first alignment, the print quality of the printing operation performed by the printhead 206 deteriorates. Such deteriorated print quality may be detected by the verifier module 402 in conjunction with the processing module 426, in accordance with various embodiments, as described hereinafter.

In a first embodiment, the verifier module 402, which is positioned in the media path of the print media 114 after the printhead 206, scans the printed image on the print media 114. The verifier module 402 measures (i.e., evaluates) the print quality of the printed image on the print media 114 and compares the measured print quality with one or more print quality standards. Examples of such one or more print quality standards may include, but not limited to, ISO/IEC 15415, ISO/IEC 15416, ISO/IEC 15426-1, ISO/IEC 15426-2, ANSI X3.182, among others. In an example embodiment, the print quality standard may be an ANSI grading level (e.g., "A"-"F"). In another example embodiment, the print quality standard may be a numeric ANSI grade level (e.g., from 0.0 to 4.0). Based on the measured print quality, the verifier module 402 may be configured to grade the print quality of the printed image, and accordingly provides ratings (e.g., grading of printed indicia, such as bar codes, in one example).

In accordance with a use case, for a current printing operation, the verifier module 402 may determine the ANSI grading level to be below "B", such as one of "C", "D", or "F", which indicates a low print quality of the printed image. This may be due to the deviation of the burn line $\mathbf{602}_{First\ Alignment}$ from the vertical radial axis $\mathbf{126}_{Vertical}$ of the platen roller 126A, as illustrated in FIG. 6A. Thus, the measured print quality is detected not to meet the print quality standards or contains parameters that fall below the threshold value (which is the minimum acceptable print quality value). Examples of such parameters may include, but are not limited to, decode parameter, contrast, modulation, fixed pattern damage, grid non-uniformity, axial non-uniformity, and unused error correction.

Accordingly, the verifier module 402 may be configured to print diagnostic information onto the print media 114. Examples of such diagnostic information may include, but are not limited to measured gray levels, ANSI grade levels, numeric ANSI grades, and/or bar width growth percentages. The diagnostic information may also include instructions defining an appropriate course of action that a user may take for correcting any issues. The corrective actions may include, for example, manipulating the plurality of fasteners to change the alignment of the printhead 206 from the first alignment to a second alignment, as described hereinafter.

In accordance with another embodiment, for detection of the print quality of the current printing operation, the verifier module 402 may be configured to determine a baseline of the barcode grading. While in the first alignment, the verifier module 402 may be configured to determine that the base line is not parallel to the boundary or margin of the print media 114.

Turning to operation 504, the printer may include means, such as the verifier module 402 in conjunction with the processing module 426, for determining whether the print quality is below the threshold value. In an embodiment where the print quality exceeds the threshold value, control passes to operation 506. For example, for the current printing operation, the verifier module 402 may determine the ANSI grading level to be one of "A" or "B", which is equal to or above the threshold value, such as "B". In another example, the base line is parallel to the print media 114 and thus the deviation from the reference line is negligible or within acceptable value. Accordingly, the print quality of the print media 114 exceeds the threshold value.

Where the print quality is less than the threshold value, control passes to operation 508. For example, for the current printing operation, the verifier module 402 may determine the ANSI grading level to be one of "C", "D", or "F", which is below the threshold value, such as "B". In another example, the base line is not parallel to the print media 114 and deviated by a value that exceeds an acceptable value. Accordingly, the print quality of the print media 114 becomes less than the threshold value.

Turning to operation 506, the printer may include means, such as the printing mechanism 406 in conjunction with the processing module 426, for continuing printing operation in the embodiment when the detected the print quality of the printhead 206 aligned at the first alignment exceeds the threshold value.

Turning to operation 508, embodiments may include means, such as the control unit 404 in conjunction with the processing module 426 and the plurality of actuators 424, for unlocking the printing assembly 112. The unlocking of the printing assembly 112 may be based on disengaging the set of additional fasteners 214 when the detected print quality of the printhead 206 aligned at first alignment, depicted by $\mathbf{206}_{First\ Alignment}$ in FIG. 6A, is below the threshold value.

In some embodiments, the printing assembly 112 may be unlocked manually by disengaging the set of additional fasteners 214 by the user via various tools, such as screw-driver, hex key, torque screw driver, flat head screw driver, Philips-head, and the like.

In an alternate embodiment, the printing assembly, such as printing assembly 112, may be unlocked based on automatically disengaging the set of additional fasteners 214 by one or more of the plurality of actuators 424 under the control of the control unit 404 in conjunction with the processing module 426. In such embodiment, the processing module 426 may be configured to generate an input signal based on the determination of the detected print quality of the printing operation being less than the threshold value. The input signal may include one or more instructions for required manipulation of the plurality of fasteners to change the alignment of the printhead 206. For example, the input signal may include a first set of instructions for a first set of actuators from the plurality of actuators 424 that may be configured to manipulate the set of additional fasteners 214 in a first predefined direction so that the set of additional fasteners 214 may be disengaged and the printing assembly 112 may be unlocked. The processing module 426 may be configured to determine such first predefined direction of the set of additional fasteners 214 based on the state of the first alignment of the printhead 206.

Accordingly, the control unit 404 may be configured to activate the plurality of actuators 424 based on the generated input signal. Initially, based on the generated input signal, the control unit 404 may be configured to activate the plurality of actuators 424 to manipulate the set of additional fasteners 214. Based on the manipulation, the set of additional fasteners 214 may be disengaged and the printing assembly 112 may be unlocked.

Turning to operation 510, the printer may include means, such as the control unit 404 in conjunction with the processing module 426 and the plurality of actuators 424, for manipulating at least one of from the group of the lateral adjustment fastener 210 and the rotational adjustment fastener 212, from a plurality of fasteners, to align the printhead 206 of the printing assembly 112 at a second alignment.

In some embodiments, the processing module 426 generates the input signal based on the determination of the detected print quality of the printing operation being less than the threshold value, as described above. The input signal may further include one or more instructions for required manipulation of the remaining plurality of fasteners to change the alignment of the printhead 206. For example, the input signal may include a second set of instructions for a second set of actuators from the plurality of actuators 424 that may be configured to manipulate the lateral adjustment fastener 210 in a second predefined direction. In yet another example, the instruction signal may include a third set of instructions for a third set of actuators from the plurality of actuators 424 that may be configured to manipulate the rotational adjustment fastener 212 in a third predefined direction. The processing module 426 may be configured to determine such second and third predefined directions of the lateral adjustment fastener 210 and the rotational adjustment fastener 212, respectively, based on the state of the first alignment of the printhead 206.

Figure 6B:
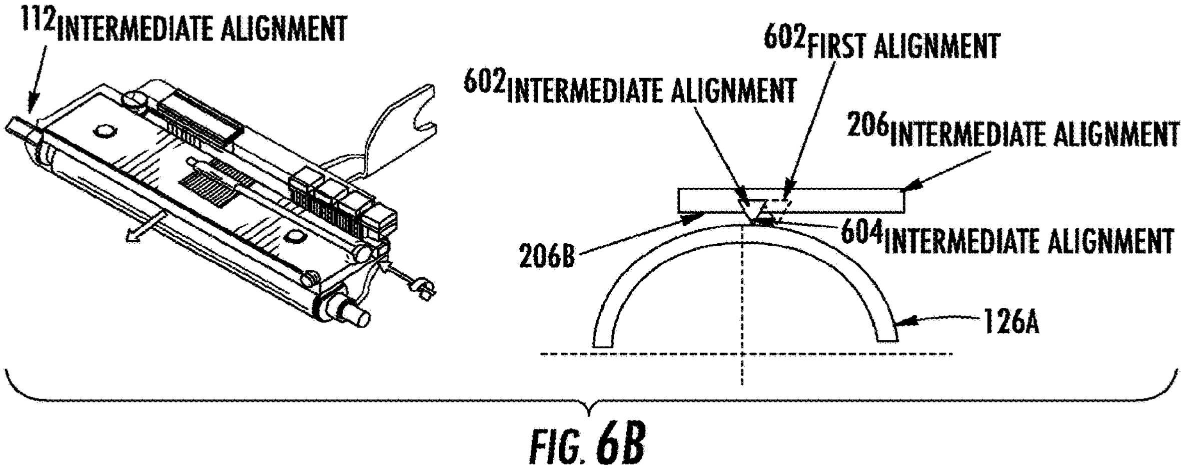
Figure 6C:
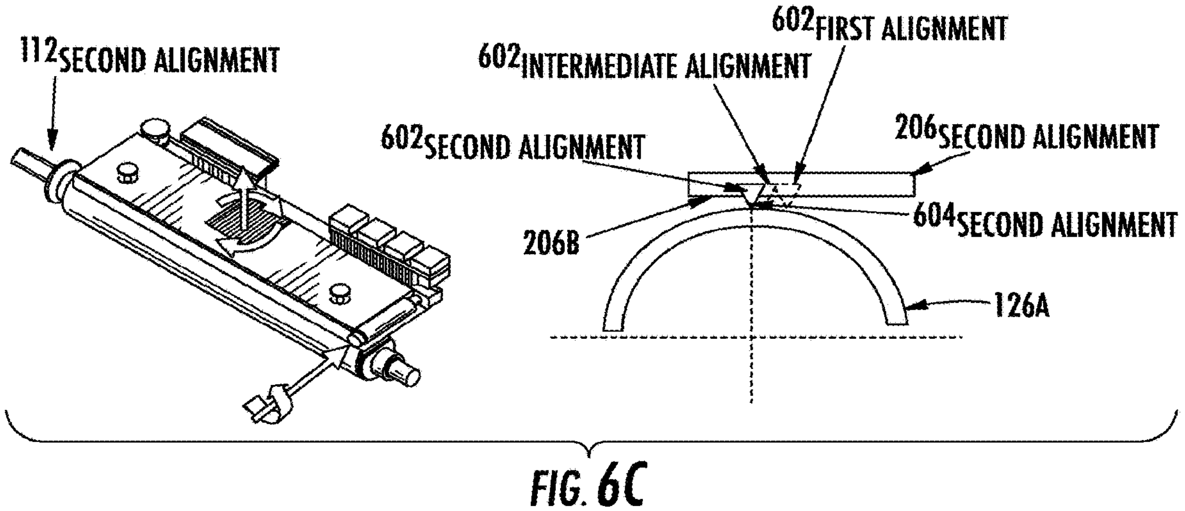

In accordance with the use case, as illustrated in FIG. 6B, based on the state of the first alignment, the processing module 426 may be configured to determine that in the first alignment, the printhead 206 may be laterally misplaced along the web direction at a lateral distance of "2 mm" away from the vertical radial axis $\mathbf{126}_{Vertical}$ of the platen roller 126A. Additionally, or alternatively, the point $\mathbf{604}_{First\ Alignment}$ may be angularly misplaced by an angle of "–3 degrees" (for example in anticlockwise direction) from the horizontal radial axis $\mathbf{126}_{Horizontal}$ of the platen roller 126A.

Accordingly, the input signal may include the second set of instructions for the second set of actuators from the plurality of actuators 424 that may be configured to manipulate the lateral adjustment fastener 210 in a second predefined direction such that the printhead 206 may be laterally displaced along the cross-web direction at a lateral distance of "2 mm" towards the vertical radial axis $\mathbf{126}_{Vertical}$ of the platen roller 126A. Accordingly, the printing assembly 112, is adjusted at an intermediate alignment, depicted by $\mathbf{112}_{Intermediate\ Alignment}$, and the printhead 206 is also adjusted at the intermediate alignment, depicted by $\mathbf{206}_{Intermediate\ Alignment}$. At the intermediate alignment, the burn line $\mathbf{602}_{Intermediate\ Alignment}$ is adjusted to be at a point 606 which is still deviating from the vertical radial axis $\mathbf{126}_{Vertical}$ of the platen roller 126A.

Additionally, or alternatively, the input signal may include the third set of instructions for the third set of actuators from the plurality of actuators 424 that may be configured to manipulate the rotational adjustment fastener 212 in a third predefined direction such that the printhead 206 may be angularly rotated along the reverse direction (i.e. clockwise direction) by "3 degrees" towards the horizontal radial axis $\mathbf{126}_{Horizontal}$ of the platen roller 126A. Accordingly, the printing assembly 112, is adjusted at a second alignment, depicted by $\mathbf{112}_{Second\ Alignment}$, and the printhead 206 is also adjusted at the second alignment, depicted by $\mathbf{206}_{Second\ Alignment}$. At the second alignment, the burn line $\mathbf{602}_{Second\ Alignment}$ is adjusted to be at a point 608 which is at optimal alignment with respect to the vertical radial axis $\mathbf{126}_{Vertical}$ and the horizontal radial axis $\mathbf{126}_{Horizontal}$ of the platen roller 126A.

Turning to operation 512, the printer may include means, such as the verifier module 402 in conjunction with the processing module 426, for verifying the print quality of printing operation performed by printhead 206 aligned at second alignment, depicted by $\mathbf{206}_{Second\ Alignment}$. Such operation of verifying the print quality of the printing operation performed by printhead 206 aligned at second alignment is performed in a similar manner as detection of the print quality of the printing operation performed by the printhead 206 aligned at first alignment, depicted by $206_{First\ Alignment}$.

Turning to operation 514, embodiments may include means, such as the verifier module 402 in conjunction with the processing module 426, for again determining whether the print quality of the printhead 206 at the second alignment is less than the threshold value. In an embodiment where the print quality exceeds the threshold value, control passes to operation 516. For example, for the current printing operation, the verifier module 402 may determine the ANSI grading level to be one of "A" or "B" at the second alignment of the printhead 206, which is equal to or above the threshold value, such as "B". In another example, the base line is parallel to the print media 114 and thus the deviation from the reference line is negligible or within an acceptable range. Accordingly, the print quality of the print media 114 exceeds the threshold value.

Where the print quality is less than the threshold value, control passes back to operation 510. For example, for the current printing operation, the verifier module 402 may determine the ANSI grading level to be one of "C", "D", or "F", which is below the threshold value, such as "B". In another example, the base line is not parallel to the print media 114 and deviated by a value that exceeds an acceptable value. Accordingly, the print quality of the print media 114 becomes less than the threshold value.

Turning to operation 516, the printing assembly 112 may include means, such as the control unit 404 in conjunction with the processing module 426 and the plurality of actuators 424, for locking the printing assembly 112 based on engaging the set of additional fasteners 214 with the printhead 206 aligned at the second alignment. Accordingly, the printhead 206 is locked at the second alignment when the print quality of the printing operation performed by the printhead 206 aligned at the second alignment is verified to exceed the threshold value.

In an embodiment, the printing assembly 112 may be locked manually by engaging the set of additional fasteners 214 by the user via various tools, such as screwdriver, hex key, torque screw driver, flat head screw driver, Philips-head, and the like.

In an alternate embodiment, the printing assembly 112 may be locked based on automatically engaging the set of additional fasteners 214 using one or more of the plurality of actuators 424 under the control of the control unit 404 in conjunction with the processing module 426. In such embodiment, the processing module 426 may be configured to generate an input signal based on the determination of the verification of the print quality of the printing operation performed by the printhead 206 at the second alignment. The input signal may include a fourth set of instructions for the first set of actuators from the plurality of actuators 424 that may be configured to manipulate the set of additional fasteners 214 in a direction opposite to the first predefined direction for unlocking, so that the set of additional fasteners 214 may be manipulated and the printing assembly 112 may be locked.

Accordingly, the control unit 404 may be configured to activate the plurality of actuators 424 based on the generated input signal. Based on the generated input signal, the control unit 404 may be configured to activate the plurality of actuators 424 to manipulate the set of additional fasteners 214. Based on the manipulation, the set of additional fasteners 214 may be engaged and the printing assembly 112 may be locked.

The disclosed printer and printing assembly 112 with the alignment adjuster 204 and the plurality of fasteners has various advantages. For example, the printing assembly 112 may cure the inaccuracies due to operator alignment error or parts tolerance during first production assembly of a printhead and a printhead bracket. The printing assembly 112 may further align the printhead 206 that is misaligned over a duration of time due to mechanical movement and/or vibration during printing operation. The printing assembly 112 enables alignment of the printhead 206 without disassembly and/or use of an external alignment jig. Further, the printing assembly 112 may be efficiently used with every type of print media, such as thin media or thick media, and yet obtain the best print quality without disassembly. Further, the printing assembly 112 may provide an optimal print quality even when there is wear and tear of the burn line of the printhead 206.

In some example embodiments, certain ones of the operations herein may be modified or further amplified as described above. Moreover, in an embodiment additional optional operations may also be included. It should be appreciated that each of the modifications, optional additions or amplifications described herein may be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but, in the alternative, the processor may be any conventional processor, controller, microcontroller, or state machine. A processor may also be implemented as a combination of computing devices, such as, a combination of a DSP and a microprocessor, a plurality of microprocessors, one or more microprocessors in conjunction with a DSP core, or any other such configuration. Alternatively, some steps or methods may be performed by circuitry that is specific to a given function.

While various embodiments in accordance with the principles disclosed herein have been shown and described above, modifications thereof may be made by one skilled in the art without departing from the spirit and the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure(s). Furthermore, any advantages and features described above may relate to specific embodiments, but shall not limit the application of such issued claims to processes and structures accomplishing any or all of the above advantages or having any or all of the above features.

In addition, the section headings used herein are provided for consistency with the suggestions under 37 C.F.R. 1.77 or to otherwise provide organizational cues. These headings shall not limit or characterize the disclosure(s) set out in any claims that may issue from this disclosure. For instance, a description of a technology in the "Background" is not to be construed as an admission that certain technology is prior art to any disclosure(s) in this disclosure. Neither is the "Summary" to be considered as a limiting characterization of the disclosure(s) set forth in issued claims. Furthermore, any reference in this disclosure to "disclosure" in the singular should not be used to argue that there is only a single point of novelty in this disclosure. Multiple disclosures may be set forth according to the limitations of the multiple claims issuing from this disclosure, and such claims accordingly define the disclosure(s), and their equivalents, that are protected thereby. In all instances, the scope of the claims shall be considered on their own merits in light of this disclosure, but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

Many modifications and other embodiments of the disclosures set forth herein will come to mind to one skilled in the art to which these disclosures pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the disclosures are not to be limited to the specific embodiments disclosed and that modifications and other embodiments are intended to be included within the scope of the appended claims. For example, the various elements or components may be combined or integrated in another system or certain features may be omitted or not implemented. Moreover, the steps in the method described above may not necessarily occur in the order depicted in the accompanying diagrams, and in some cases one or more of the steps depicted may occur substantially simultaneously, or additional steps may be involved. Although specific terms are employed herein, they are used in a generic and descriptive sense only and not for purposes of limitation.

What is claimed is:

1. A printer comprising:

a verifier;

a printhead; and a processor in communication with the verifier and the printhead, wherein the processor is configured to:

cause the verifier to scan an indicia printed on print media by the printhead;

determine a deviation value associated with the printhead based on the scanned indicia;

subsequent to determining that a print quality score of the scanned indicia does not satisfy a predetermined value, cause a lateral movement of the printhead through manipulating a lateral adjustment fastener based on the deviation value; and cause the printhead to print a subsequent indicia on the print media.

2. The printer of claim 1 further comprising:

a printing assembly comprising:

a printhead bracket fixedly attached to the printer; and an alignment adjuster fastened between the printhead bracket and the printhead.

3. The printer of claim 2, wherein the printing assembly further comprises:

a plurality of fasteners operatively engaged with the alignment adjuster, wherein the plurality of fasteners comprises the lateral adjustment fastener operatively engaged with a gear rack of the alignment adjuster.

4. The printer of claim 2, wherein the printhead bracket further comprises a longitudinal channel that receives the lateral adjustment fastener.

5. The printer of claim 2, wherein the lateral adjustment fastener is configured to provide the lateral movement to the alignment adjuster and the printhead.

6. The printer of claim 1, wherein the printhead is initially aligned at a first alignment, wherein the deviation value indicates a misalignment of the printhead with respect to the first alignment.

7. The printer of claim 1, wherein the processor is further configured to compare the print quality score with a previous print quality score to determine whether a print quality is increased.

8. The printer of claim 7, wherein the processor is further configured to:

in response to determining that the print quality is increased, manipulate the lateral adjustment fastener in a clockwise direction per set angle based on the deviation value.

9. The printer of claim 7, wherein the processor is further configured to:

in response to determining that the print quality is not increased, manipulate the lateral adjustment fastener in an anti-clockwise direction per set angle based on the deviation value.

10. The printer of claim 1, wherein the processor is further configured to:

cause the verifier to scan one or more other indicia printed by the printhead; and determine another deviation value based on the scanned one or more other indicia.

11. A computer-implemented method comprising:

causing a verifier of a printer to scan an indicia, wherein the indicia is printed on print media by a printhead of the printer;

determining a deviation value associated with the printhead based on the scanned indicia;

subsequent to determining that a print quality score of the scanned indicia does not satisfy a predetermined value, causing a lateral movement of the printhead through manipulating a lateral adjustment fastener based on the deviation value; and causing the printhead to print a subsequent indicia on the print media.

12. The computer-implemented method of claim 11, wherein the printer comprises a printing assembly, wherein the printing assembly comprises a printhead bracket fixedly attached to the printer and an alignment adjuster fastened between the printhead bracket and the printhead.

13. The computer-implemented method of claim 12, wherein the printing assembly further comprises a plurality of fasteners operatively engaged with the alignment adjuster, wherein the plurality of fasteners comprises the lateral adjustment fastener operatively engaged with a gear rack of the alignment adjuster.

14. The computer-implemented method of claim 12, wherein the printhead bracket further comprises a longitudinal channel that receives the lateral adjustment fastener.

15. The computer-implemented method of claim 12, wherein the lateral adjustment fastener is configured to provide the lateral movement to the alignment adjuster and the printhead.

16. The computer-implemented method of claim 11, wherein the printhead is initially aligned at a first alignment, wherein the deviation value indicates a misalignment of the printhead with respect to the first alignment.

17. The computer-implemented method of claim 11 further comprising comparing the print quality score with a previous print quality score to determine whether a print quality is increased.

18. The computer-implemented method of claim 17 further comprising, in response to determining that the print quality is increased, manipulating the lateral adjustment fastener in a clockwise direction per set angle based on the deviation value.

19. The computer-implemented method of claim 17, further comprising, in response to determining that the print quality is not increased, manipulating the lateral adjustment fastener in an anti-clockwise direction per set angle based on the deviation value.

20. The computer-implemented method of claim 11 further comprising:

causing the verifier to scan one or more other indicia printed by the printhead; and determining another deviation value based on the scanned one or more other indicia.

* * * * *